United States Patent
Hayashi et al.

(10) Patent No.: US 7,739,086 B2
(45) Date of Patent: *Jun. 15, 2010

(54) INFORMATION DELIVERING METHOD

(75) Inventors: Toru Hayashi, Tokyo (JP); Koji Nomura, Tokyo (JP)

(73) Assignee: Netdimension Corporation (JP)

( * ) Notice: Subject to any disclaimer, the term of this patent is extended or adjusted under 35 U.S.C. 154(b) by 354 days.

This patent is subject to a terminal disclaimer.

(21) Appl. No.: 11/680,744

(22) Filed: Mar. 1, 2007

(65) Prior Publication Data

US 2007/0146361 A1 Jun. 28, 2007

Related U.S. Application Data

(63) Continuation of application No. 10/049,793, filed as application No. PCT/JP01/10496 on Nov. 30, 2001, now Pat. No. 7,225,114.

(30) Foreign Application Priority Data

May 14, 2001 (JP) .............................. 2001-143596

(51) Int. Cl.
G06F 9/455 (2006.01)
(52) U.S. Cl. ........................................... 703/6; 345/473
(58) Field of Classification Search ..................... 703/1, 703/11, 6; 345/473, 427, 420, 848, 419, 345/781, 584, 474; 709/223, 224, 220; 433/24; 700/98; 715/513, 533
See application file for complete search history.

(56) References Cited

U.S. PATENT DOCUMENTS 5,912,671 A * 6/1999 Oka ............................ 345/427

6,525,725 B1 * 2/2003 Deering ....................... 345/419
6,614,428 B1 * 9/2003 Lengyel ...................... 345/420
7,225,114 B2 * 5/2007 Hayashi et al. ................ 703/6
2001/0042118 A1 * 11/2001 Miyake et al. .............. 709/223

(Continued)

FOREIGN PATENT DOCUMENTS

EP 0753836 A 1/1997

(Continued)

OTHER PUBLICATIONS

Blackwell, et al., "Reconstruction of Massive Defects in the Head and Neck: The Role of Simultaneous Distant and Regional Flaps", John Wiley & Sons, Inc., 1997.

(Continued)

*Primary Examiner*—Paul L Rodriguez
*Assistant Examiner*—Kandasamy Thangavelu
(74) *Attorney, Agent, or Firm*—Kilpatrick Stockton LLP

(57) ABSTRACT

The information delivering server for providing three-dimensional content is composed of a property information master storage device for storing the property information of the three-dimensional content, a skeleton master storage device for storing the content of invariable components (skeleton), a parameter master storage device for storing parameters, a property information management means for registering and managing the property information, a skeleton registration means for registering content skeletons, a parameter registration means for registering content parameters, a content providing means for providing the three-dimensional content for customers with reference to the skeleton storage device and the parameter storage device. Accordingly, in accordance with the present invention, it is possible to provide an information delivering system enabling easy modification of three-dimensional content.

9 Claims, 30 Drawing Sheets

U.S. PATENT DOCUMENTS

| | | | |
|---|---|---|---|
| 2001/0051535 A1* | 12/2001 | Kamimura et al. | 455/566 |
| 2001/0055039 A1* | 12/2001 | Matsuda | 345/848 |
| 2002/0055800 A1* | 5/2002 | Nikolskiy et al. | 700/98 |
| 2002/0064747 A1* | 5/2002 | Chishti et al. | 433/24 |
| 2002/0138607 A1* | 9/2002 | O'Rourke et al. | 709/224 |
| 2003/0001859 A1* | 1/2003 | Sloan et al. | 345/584 |
| 2003/0005090 A1* | 1/2003 | Sullivan et al. | 709/220 |
| 2003/0020718 A1* | 1/2003 | Marshall et al. | 345/474 |
| 2003/0117402 A1* | 6/2003 | Hubrecht et al. | 345/473 |
| 2003/0197737 A1* | 10/2003 | Kim | 345/781 |
| 2004/0225958 A1* | 11/2004 | Halpert et al. | 715/513 |

FOREIGN PATENT DOCUMENTS

| | | |
|---|---|---|
| JP | 63-005478 | 1/1988 |
| JP | 08-087489 | 4/1996 |
| JP | 09-097153 | 4/1997 |
| JP | 09-147134 | 6/1997 |
| JP | 09-198407 | 7/1997 |
| JP | 10-40419 | 2/1998 |
| JP | 10-198823 | 7/1998 |
| JP | 10-222698 | 8/1998 |
| JP | 10-312392 | 11/1998 |
| JP | 10-312469 | 11/1998 |
| JP | 10-312471 | 11/1998 |
| JP | 11-120379 | 4/1999 |
| JP | 2000-105738 | 4/2000 |

OTHER PUBLICATIONS

Tsurumaki, "True Space 4 Nihongo-ban CG World", Dec. 29, 1998, Sumitomo Kinzoku System Kaihatsu, Works Corporation, vol. 6, p. 26, "Bone ni yoru Henkei Kino ga Tsuika sareta".

Robertson et al., "Information Visualization Using 3D Interactive Animation", Communications of the ACM, vol. 36, No. 4, Apr. 1993, pp. 57-71.

Rist et al., "Adding Animated Presentation Agents to the Interface", 1997 International Conference on Intelligent User Interfaces, Orlando, Jan. 6-9, 1997, pp. 79-86.

Seo et al., "VPARK—A Windows NT Software Platform for a Virtual Networked Amusement Park", Proceedings Computer Graphics International 2000 IEEE Comput. Soc, Los Alamitos, CA, USA, 2000, pp. 309-315.

Capin et al., "Virtual Human Representation and Communication in VLNET Networked Virtual Environment", IEEE Computer Graphics and Applications, vol. 17, No. 2, pp. 42-53.

Thalmann, et al., "Fast Realistic Human Body Deformations for Animations and VR Applications", Proceedings Computer Graphics International 2000 IEEE Comput. Soc. Press, Los Alamitos, CA, USA, 1996, pp. 166-174.

Burtnyk et al., "Interactive Skeleton Techniques for Enhancing Motion Dynamics in Key Frame Animation", Communications of the ACM USA, vol. 19, No. 10, Oct. 1976, pp. 564-569.

* cited by examiner

INFORMATION DELIVERING METHOD

CROSS REFERENCE TO RELATED APPLICATIONS

This application is a continuation patent application of U.S. patent application Ser. No. 10/049,793, filed Feb. 13, 2002 which is a 371 of PCT Application No. PCT/JP01/10496, filed Nov. 30, 2001 which is based upon and claims the benefit of priority from Japanese Patent Application P2001-143596 filed on May 14, 2001, all of which are incorporated herein by reference.

BACKGROUND OF THE INVENTION

The present invention relates to an information delivering system and an information delivering method capable of providing customers with information by the use of three-dimensional content.

With the recent advances in the communication technology such as the Internet, it is acknowledged that users retrieve a variety of information items through communication terminals. When a unit of information is retrieved through such a communication network, it is required that the unit of information is compact and portable without compromising the quality of the information in order to meet the requirement of real-time speed of the information.

The following are some examples as follows:

(a) A successful bid is made in a net auction to get an article or one's home.

(b) Information about a ticket booking or part-time jobs is obtained online through a communication terminal placed in a convenience store or the like.

(c) Information about bargain offers or sales times of the stores near the current location is obtained online through a mobile phone.

In this situation, the user can retrieve desired information through the windows as illustrated in FIG. 1 to FIG. 2.

FIG. 1 is a schematic diagram showing an exemplary set of the images through which the user retrieves desired information about a net auction. At first, after clicking "Enter" in the window P101, the window P102 is linked and opened with an indication of "please select a category". The user selects a category of "computer" or "living" in P102. When the category of "Computers" is selected and clicked, the window P103 is linked and opened to provide subcategories such as "Hardware", "Software" and so forth which are subdivisions of the computer category. Also, when the category of "Living" is selected and clicked in the window P102, the window P104 is linked and opened to provide subcategories such as "Accommodation Tickets", "Home Furnishing" and so forth which are subdivisions of the living category. One of the subcategories in the window P103 and the window P104 is clicked to review the list of articles placed on the auction.

Also, FIG. 2 is a schematic diagram showing an exemplary window opened when the user refers to the seat information of tickets. FIG. 2 is a plan view showing the arrangement of seats so that the user selects a desired seat therefrom with reference to this plan view.

However, in accordance with the conventional method of providing information, there is a limitation to the information obtained at one time so that it is necessary to open a number of windows before the user acquires a desired unit of information.

Also, the conventional method of providing information is based upon a routine way which has been commonly and broadly used, and therefore the interface can hardly be said to attract the user's interest. Accordingly, it is necessary to provide an interface attractive to users.

In order to solve these shortcomings, a method of providing information in the form of three-dimensional content has been proposed rather than the conventional method of providing information in the form of two-dimensional content. However, in the case of three-dimensional content, the data structure is very complicated so that, from a practical standpoint, it is difficult for people at large to handle the data. For example, when the data has to be modified, it is necessary to ask again the creator of the three-dimensional content for the modification. Also, in a case where the data size of the three-dimensional content is large while the available infrastructure is restricted, that three-dimensional content is hard to deal with. Irrespective of the widely known fact that the use of such three-dimensional content is quite effective, there are limitations on the application of three-dimensional content.

DISCLOSURE OF THE INVENTION

The present invention relates to an information delivering system serving to deliver information through a communication network constructed by interconnecting communication lines. Namely, the information delivering system in accordance with a first aspect of the present invention is provided with an information delivering server connected to a communication network and serving to deliver three-dimensional content for the presentation of information, and client terminals for receiving units of information through the communication network and displaying at the display terminal. The three-dimensional content as described here is generated by creating a three-dimensional virtual space as projected onto a plane and arranging objects indicative of information within the three-dimensional space.

In the followings, information delivering systems and information delivering methods in accordance with the present invention will be described with reference to the accompanying drawings showing embodiments thereof.

FIRST EMBODIMENT

Figure 1:
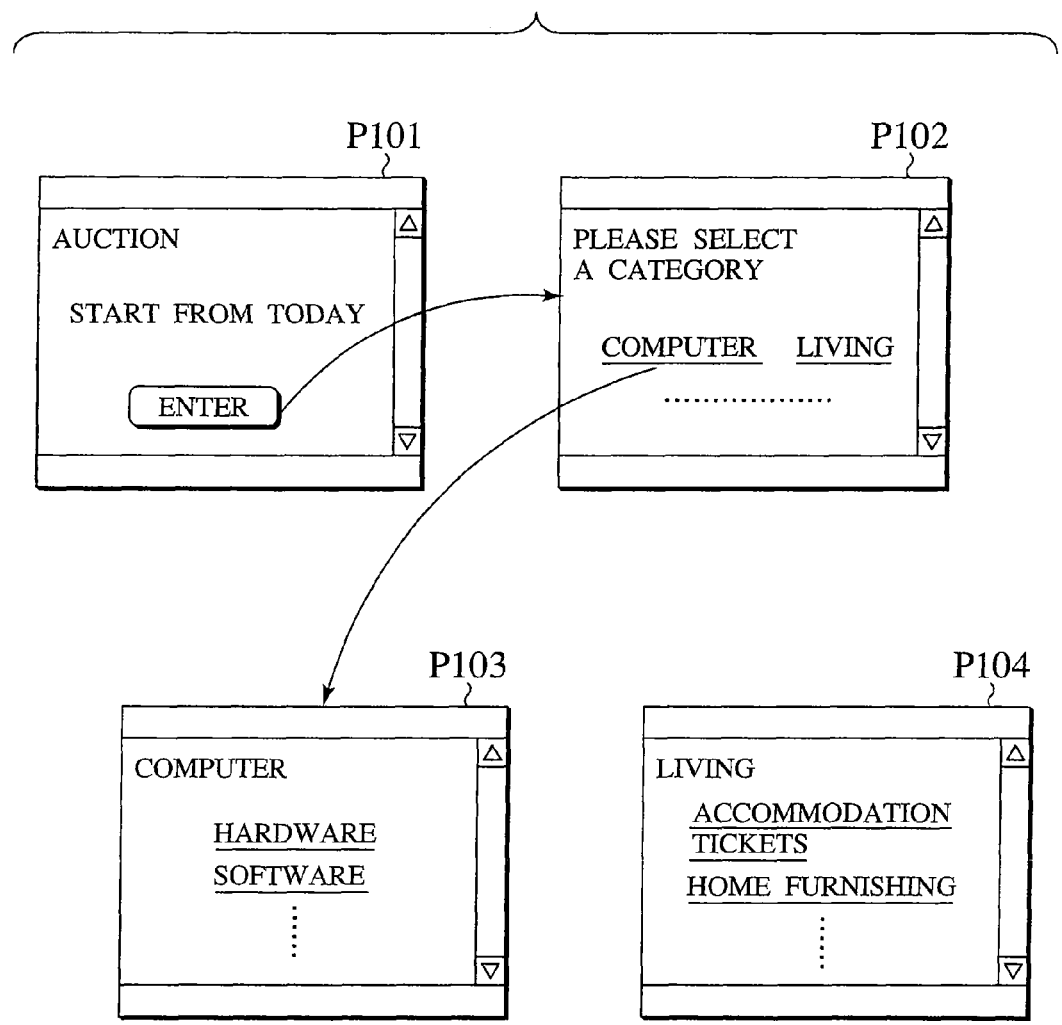
FIG. 1 is a schematic diagram showing an example of content in accordance with a prior art technique.
Figure 2:
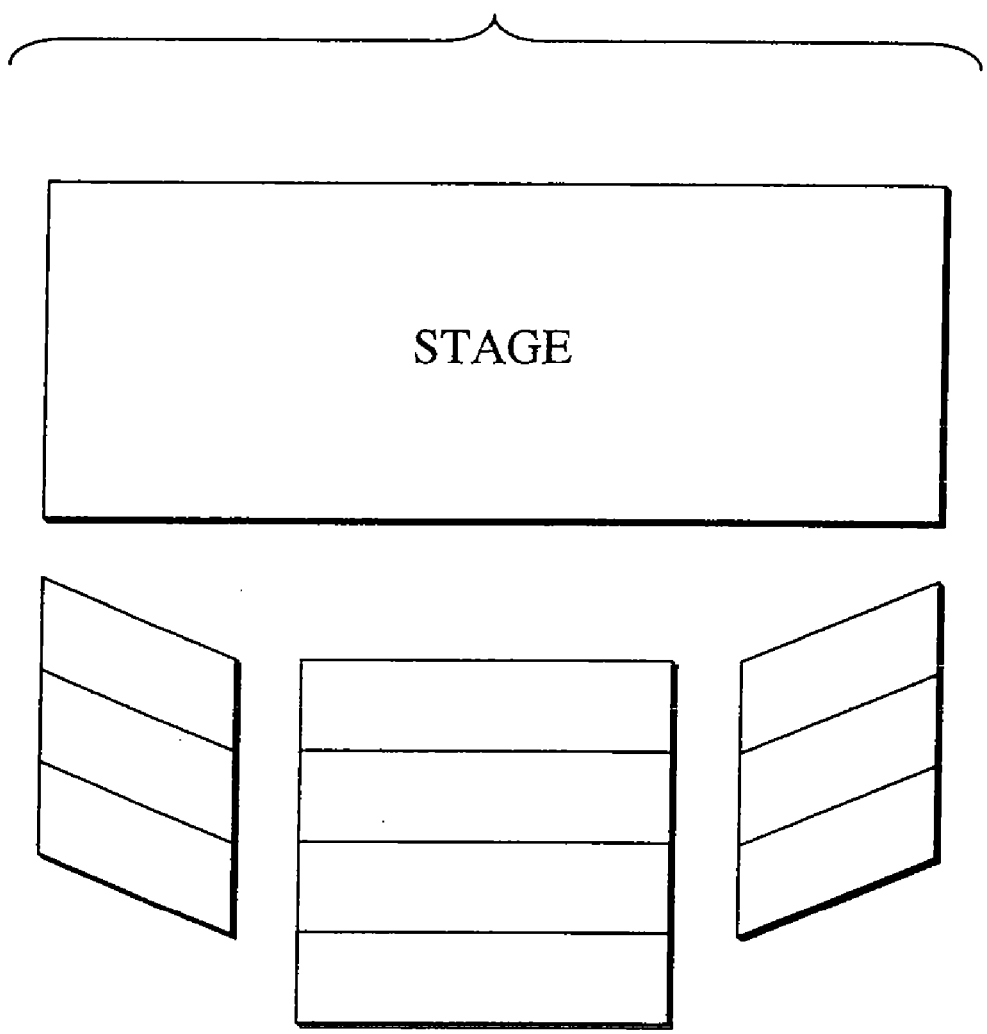
FIG. 2 is a schematic diagram showing an example of content in accordance with the prior art technique (No. 2).
Figure 3:
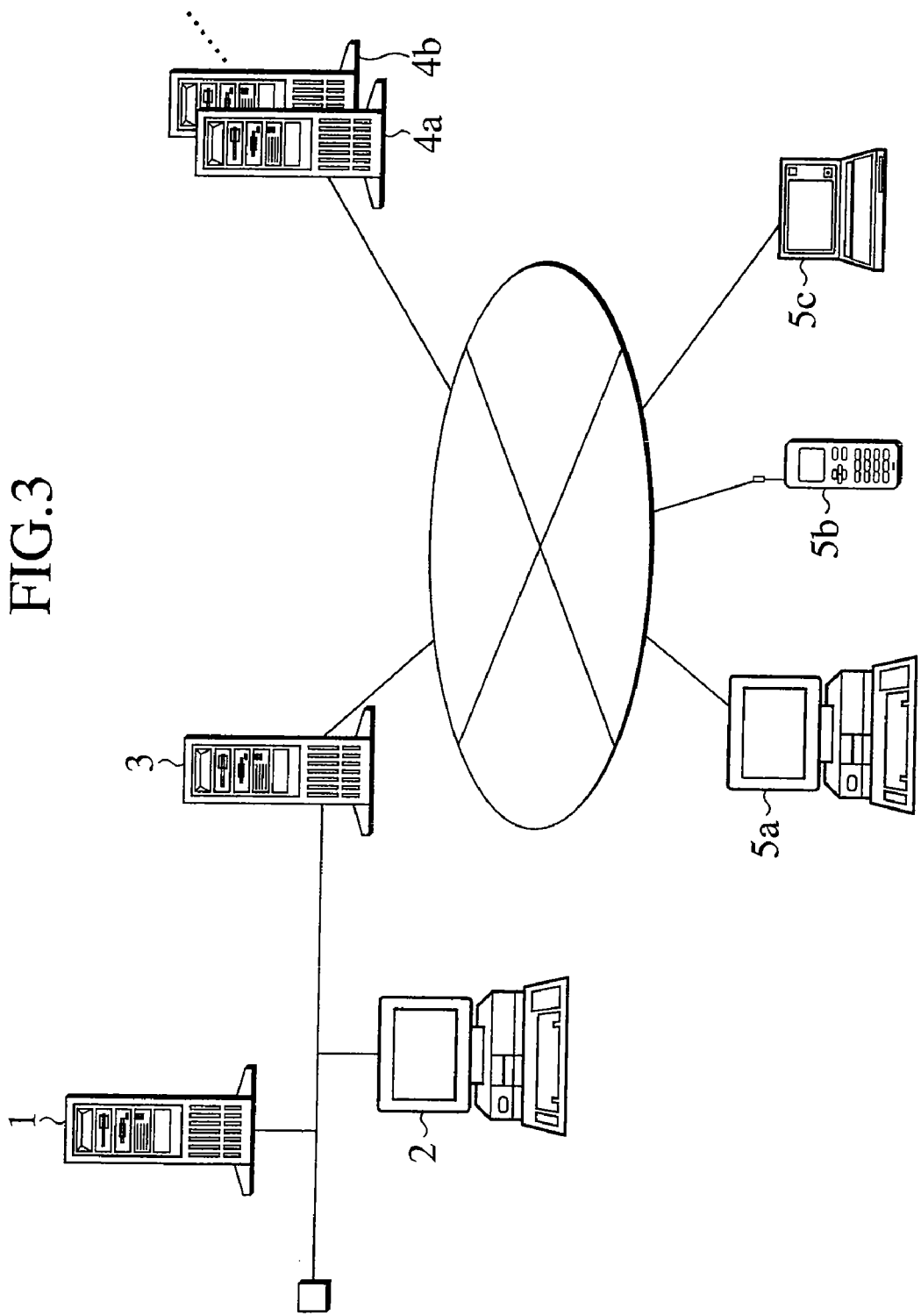
FIG. 3 is a schematic diagram showing an information delivering server in accordance with a first embodiment of the present invention.

The first embodiment of the present invention will be explained with reference to drawings. FIG. 3 is a schematic system diagram showing an information delivering system in accordance with a first embodiment of the present invention.

The information delivering system is composed of an information delivering server 1, a content generation terminal 2, a gateway server 3, a first information provider server 4a, a second information provider server 4b a first client terminal 5a, a second client terminal 5b, a third client terminal 5c and a communication line 6.

The information delivering server 1 is a server for providing three-dimensional content while the content generation terminal 2 is a terminal for generating three-dimensional content and transmitting the information thereof to the information delivering server 1. The gateway server 3 is a server for providing the information delivering server 1 and the content generation terminal 2 access to the communication line 6.

In this case, three-dimensional content is generated by creating a three-dimensional virtual space as projected onto a plane and arranging objects indicative of information within the three-dimensional space. The objects are provided in order that the positions thereof are associated with the content of the information. Meanwhile, an object is a polyhedron each of whose facets is used to display information in order that the respective units of the information are shown by turning the polyhedron. Furthermore, the information of objects arranged in a certain direction provides a hierarchical representation corresponding to the positions of the objects.

The information delivering server 1, the content generation terminal 2 and the gateway server 3 are connected to each other, preferably by means of a LAN and the like. The first information provider server 4a and the second information provider server 4b are servers for providing information and serve to ask the information delivering server 1 for delivering and modification of the three-dimensional content and to send other requests. The first client terminal 5a, the second client terminal 5b, the third client terminal 5c are information terminals such as personal computers, mobile phones, PDAs and so forth which can be connected to the communication line 6. These terminals are connected to the information delivering server 1 to receive the three-dimensional content. The first client terminal 5a, the second client terminal 5b, the third client terminal 5c serve to manipulate the three-dimensional content provided for information presentation. The communication line 6 functions in a network such as the Internet, a personal computer communication network, a packet communication network and the like. The gateway server 3, the first information provider server 4a, the second information provider server 4b, the first client terminal 5a, the second client terminal 5b, the third client terminal 5c are connected to the communication line 6 by wire or air through the access points of providers, gateway servers and the like.

Figure 4:
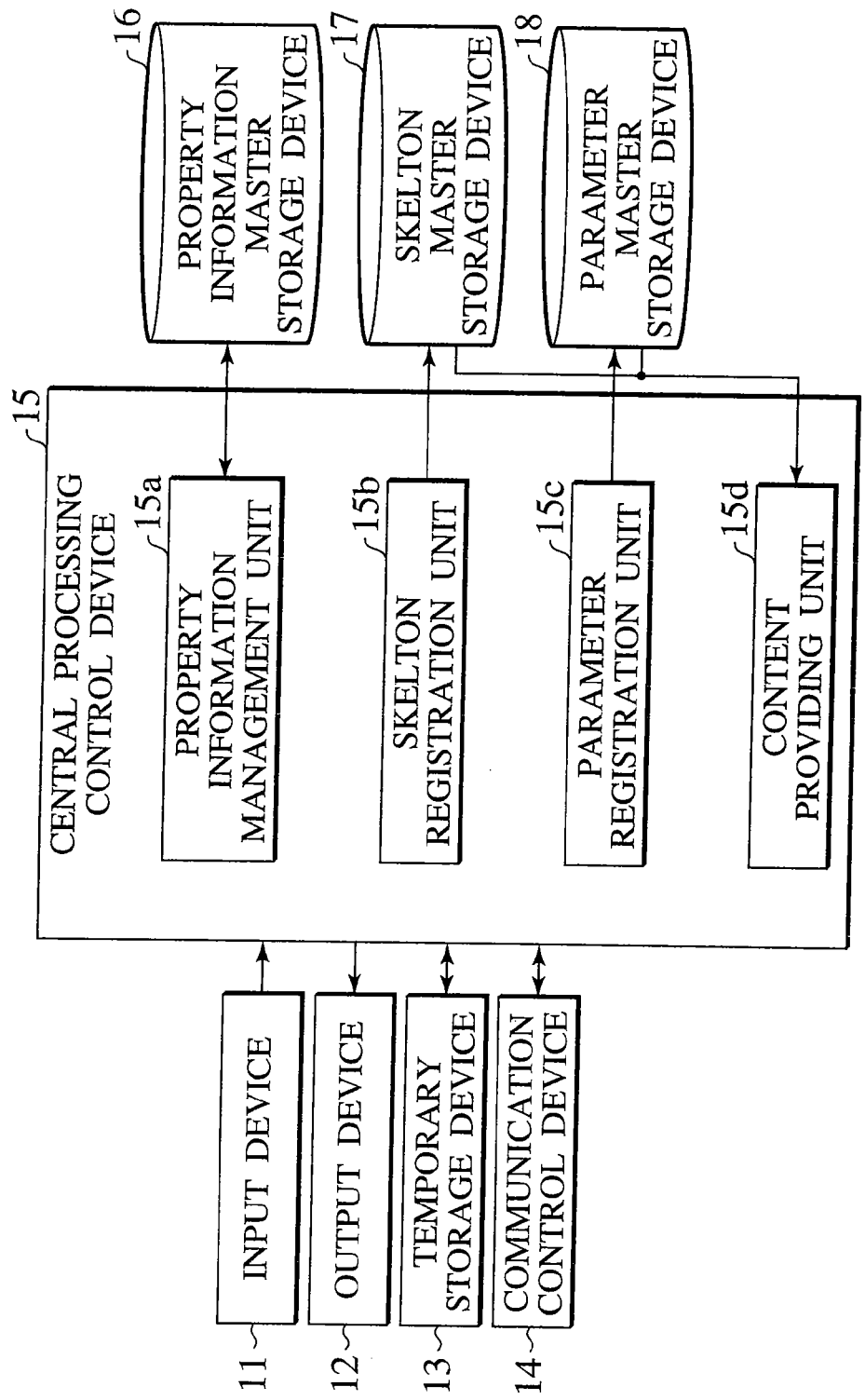
FIG. 4 is a functional block diagram showing the information delivering server in accordance with the first embodiment of the present invention.

FIG. 4 is a functional block diagram showing the information delivering server 1. The information delivering server 1 is composed of an input device 11, an output device 12, a temporary storage device 13, a communication control device 14, a central processing control device 15, a property information master storage device 16, a skeleton master storage device 17, a parameter master storage device 18 and the like.

The input device 11 is composed of a keyboard, a mouse and the like while the output device 12 is composed, for example, of a display system such as a liquid crystal panel, a CRT monitor and the like or a printing device such as an inkjet printer, a laser printer and the like. The temporary storage device 13 is implemented with a ROM and a RAM. The ROM serves as a program memory for storing programs which are run in the central processing control device 15 while the RAM serves as a data memory for storing data and is used as a working area during execution of programs in the central processing control device 15. The communication control device 14 serves as an interface for connection with the LAN and the gateway server 3.

The property information master storage device 16 serves to store the property information of the three-dimensional content as transferred from the first information provider server 4a and the second information provider server 4b. The skeleton master storage device 17 serves to store the content of invariable components (skeleton) among three-dimensional content while the parameter master storage device 18 serves to store parameters designated by an information provider server.

The central processing control device 15 is provided with a property information management unit 15a, a skeleton registration unit 15b a parameter registration unit 15c and a content providing unit 15d.

The property information management unit 15a serves to register property information in the property information master storage device 16 and manage the property information such as the clients and the association information between the content skeleton and the content parameters for the respective three-dimensional content provided by the information delivering server 1.

The skeleton registration unit 15b serves to register the content skeleton as obtained from the content generation terminal 2 in the skeleton master storage device 17 while the parameter registration unit 15c serves to register the content parameters in the parameter master storage device 18.

The content providing unit 15d serves to generate and provide three-dimensional content with reference to the skeleton master storage device 17 and the parameter master storage device 18. The content providing unit 15d may provide three-dimensional content by dynamically linking the content skeleton and the content parameters together or by simply transferring three-dimensional content that has been compiled in advance.

Figure 5:
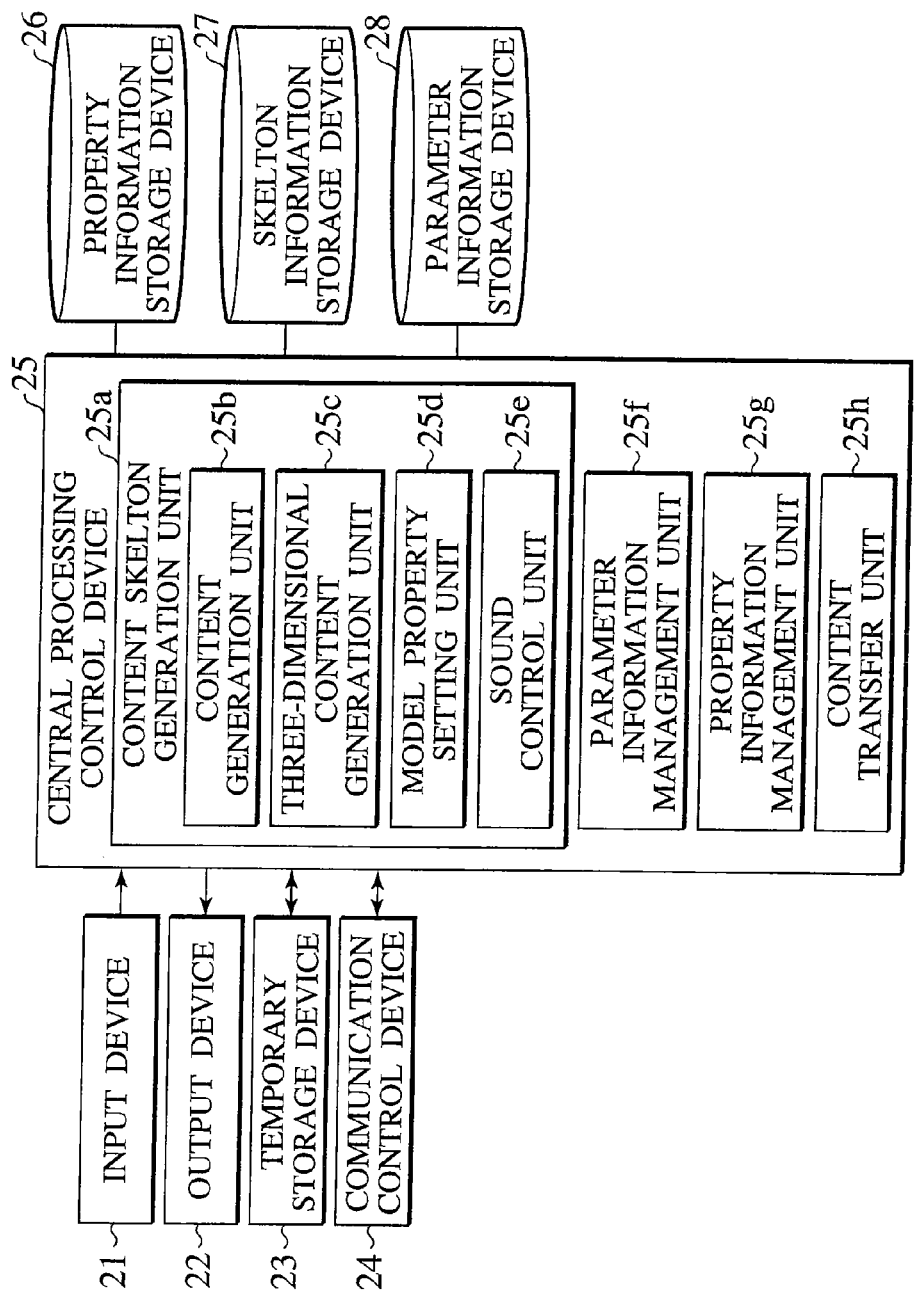
FIG. 5 is a functional block diagram showing the content generation terminal in accordance with the first embodiment of the present invention.

FIG. 5 is a functional block diagram showing the content generation terminal 2. The content generation terminal 2 is composed of an input device 21, an output device 22, a temporary storage device 23, a communication control device 24, a central processing control device 25, a property information storage device 26, a skeleton information storage device 27, the parameter information storage device 18 and the like.

The input device 21 is composed of a keyboard, a mouse and the like while the output device 22 is composed, for example, of a liquid crystal panel, a CRT monitor and the like or a printing device such as an inkjet printer, a laser printer and the like. The temporary storage device 23 is implemented by ROM and RAM. The ROM serves as a program memory for storing a program run in the central processing control device 25 while the RAM serves as a data memory for storing data which is used as a working area during execution of the program in the central processing control device 25. The communication control device 24 serves as an interface for connection of the LAN and the gateway server 3.

The property information storage device 26 serves to store the property information of the three-dimensional content as generated. The skeleton information storage device 27 serves to store the content of invariable components (skeleton) among the three-dimensional content while the content parameter storage device 28 serves to store parameters which are designated by an information provider server.

The central processing control device 25 is provided with a content skeleton generation unit 25a, a parameter information management unit 25f, a property information management unit 25g and a content transfer unit 25h.

The content skeleton generation unit 25a serves to generate content skeletons as the content of invariable components among three-dimensional content and register them in the skeleton information storage device 27.

The content skeleton generation unit 25a is provided with a content generation unit 25b, a three-dimensional content generation unit 25c, a model property setting unit 25d and a sound control unit 25e. The content generation unit 25b serves to generate a variety of content. More specifically, text fonts, bit-map images, two-dimensional bit-map images, three-dimensional rendering of images, motion images and the like are generated, displayed and/or reproduced. The three-dimensional content generation unit 25c serves to generate three-dimensional content. More specifically, the three-dimensional content generation unit 25c serves to generate polygon models on the basis of triangles, to perform Gouraud shading, to generate animations of models having hierarchical structures, to set the respective materials and textures, to group the setting information about materials and textures in the respective model, to group the setting information about the skin and bone structure, to set the camera condition (selection of cameras, the focal length, the front/rear distance, the fog effect), to set the lighting (the environmental light, the parallel light, the point source, the spot light, the angle and distance), to generate animations by making use of the respective parameters by material tracks, to generate multiple viewports by the use of a plurality of cameras, to generate billboard textures, to generate background bit-map images, to generate shadows by designating symmetry or asymmetry, to set transparent textures, mini-map, anti-aliasing and the like, to perform skinning and generate billboard textures by grouping models, to generate rendered textures, to display rendered text textures, to change textures and so forth.

The model property setting unit 25d serves to determine the properties of models. More specifically, the model property setting unit 25d serves to set up the display, the materials (the settings of the colors of models, the amount and color of highlighting, the colors of luminance, translucent, the addition mode, the subtraction mode), the bit-map textures, the movie textures, the alpha textures, the texture mapping formats, the texture mapping coordinates, the multiple textures and so forth.

The sound control unit 25e serves to reproduce sound sources, MIDI data, MP3 files and the like, to start and stop reproduction, and to set up the repeat and the like. The parameter information management unit 25f serves to control the management of information about adjustable parameters which are registered in the parameter information storage device 28. Furthermore, the parameter information management unit 25f serves to provide the formats of parameters which are adjusted by the first information provider server 4a and the second information provider server 4b. The property information management unit 25g serves to control the management of the property information about content and to register the property information in the property information storage device 26. The content transfer unit 25h serves to transmit the content as generated to the information provider server 1.

Figure 6:
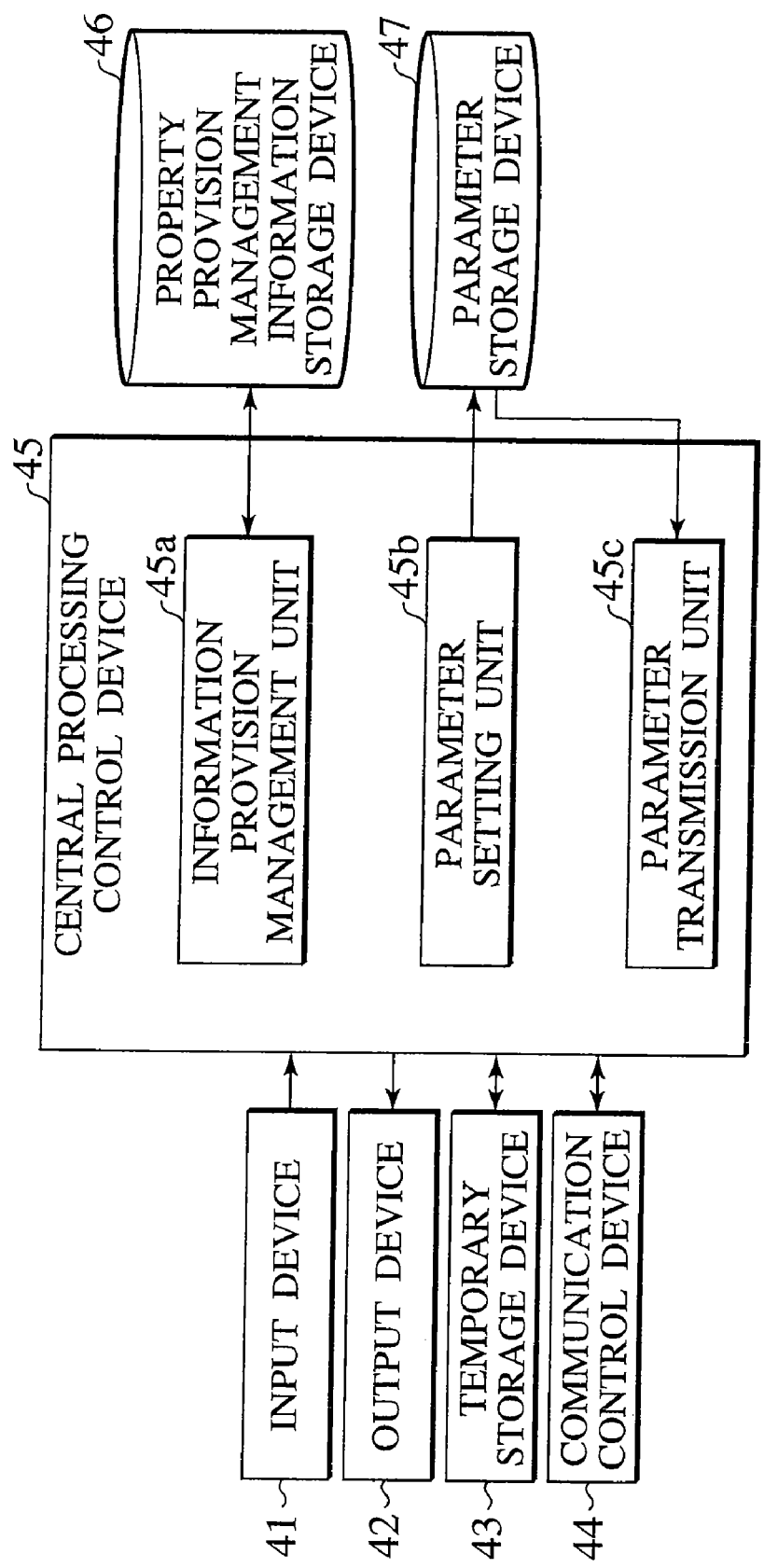
FIG. 6 is a functional block diagram showing of the information provider server of the information delivering server in accordance with the first embodiment of the present invention.

FIG. 6 is a functional block diagram showing the first information provider server 4a. The second information provider server 4b is designed in the same way.

The first information provider server 4a is composed of an input device 41, an output device 42, a temporary storage device 43, a communication control device 44, a central processing control device 45, an information provision management information storage device 46, a content parameter storage device 47 and the like.

The input device 41 is composed of a keyboard, a mouse and the like while the output device 42 is composed, for example, of a display system such as a liquid crystal panel, a CRT monitor and the like or a printing device such as an inkjet printer, a laser printer and the like. The temporary storage device 43 is implemented by ROM and RAM. The ROM serves as a program memory and the like for storing a program run in the central processing control device 45 while the RAM serves as a data memory for storing data which is used as a working area during execution of the program in the central processing control device 45. The communication control device 44 serves as an interface for connection of the LAN and the gateway server 3.

The property provision management information storage device 46 serves to store merchandise information, customer information, credit information and the like as required by the first information provider server 4a to provide information. The content parameter storage device 47 serves to store the parameters of three-dimensional content which are adjustable by the first information provider server 4a.

The central processing control device 45 is composed of an information provision management unit 45a, a content parameter setting unit 45b and a content parameter transmission unit 45c.

The information provision management unit 45a serves to provide information with reference to the information provision management information storage device 46. The content parameter setting unit 45b serves to set up parameters on the basis of the formats as provided and store the parameters in the content parameter storage device 47. The content parameter transmission unit 45c serves to transmit the content parameters as stored in the content parameter storage device 46 to the information delivering server 1.

Figure 7:
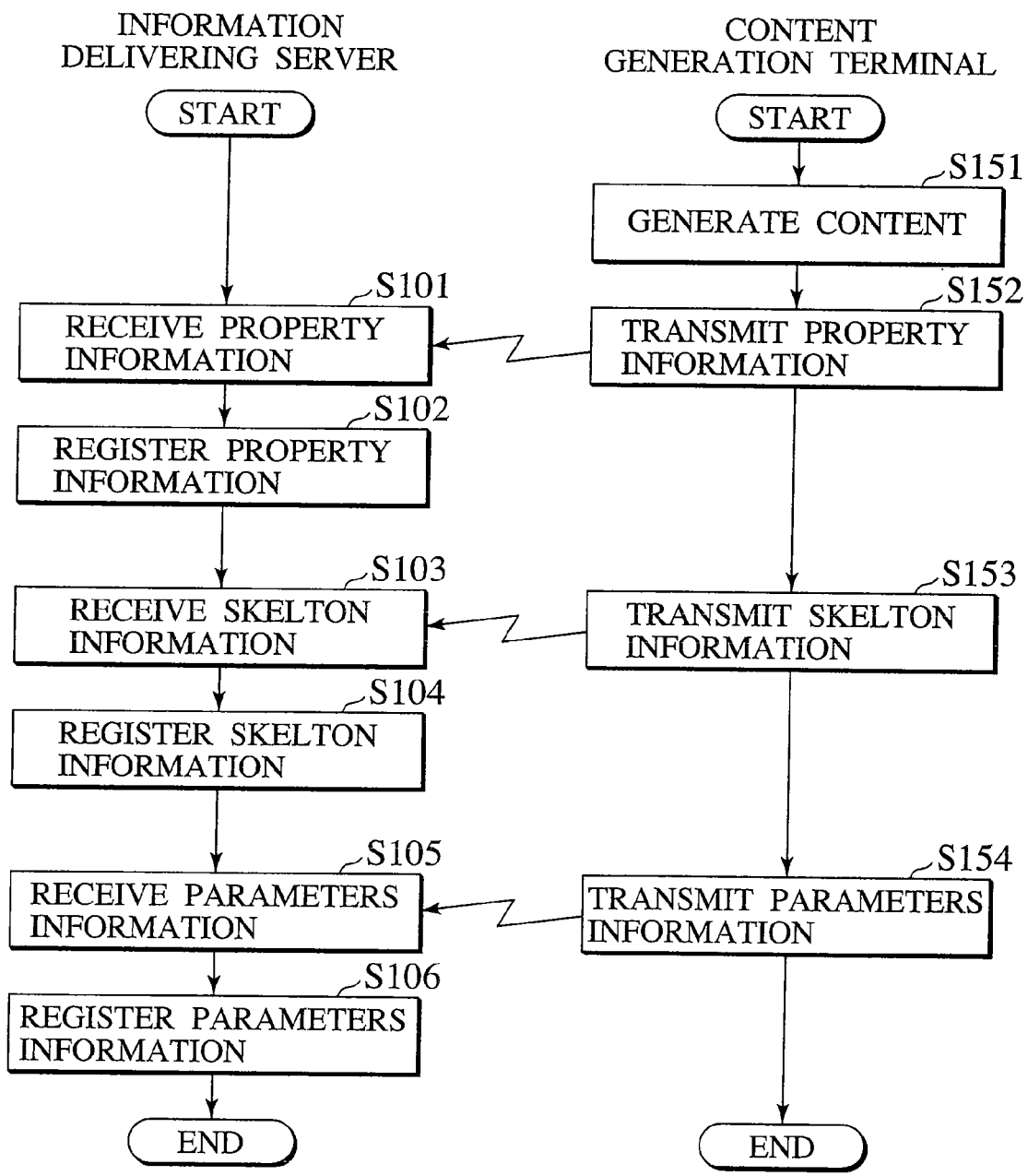
FIG. 7 is a flowchart showing the procedure of transmitting content to the information delivering server from the content generation terminal and registering the content in the information delivering server in accordance with the first embodiment of the present invention.

FIG. 7 is a flowchart showing the procedure of generating three-dimensional content by means of the content generation terminal 2 and registering the three-dimensional content in the information delivering server 1.

(a) At first, in step S151, the content generation terminal 2 generates three-dimensional content and registers the three-dimensional content in the property information storage device 26, the skeleton information storage device 27 and the parameter information storage device 28. Next, in step S152, the content generation terminal 2 transmits the content information to the information delivering server 1 with reference to the content information storage device 26. Then, the information delivering server 1 receives the content information in step S101 and registers the content information in the property information master storage device 16 by means of the property information management unit 15a.

(b) Next, in step S153, the content generation terminal 2 transmits the content skeleton information to the information delivering server 1 by means of the skeleton information storage device 27. Then, the information delivering server 1 receives content skeleton informations in step S103, and registers the content skeleton information in the skeleton master storage device 18 by means of the skeleton registration unit 15b.

(c) Furthermore, in step S154, the content generation terminal 2 transmits the content parameters information to the information delivering server 1 by means of the parameter information storage device 28. Then, the information delivering server 1 receives content parameters information in step S105 and registers the content parameters information in the parameter master storage device 18 by means of the parameter registration unit 15c.

Figure 8:
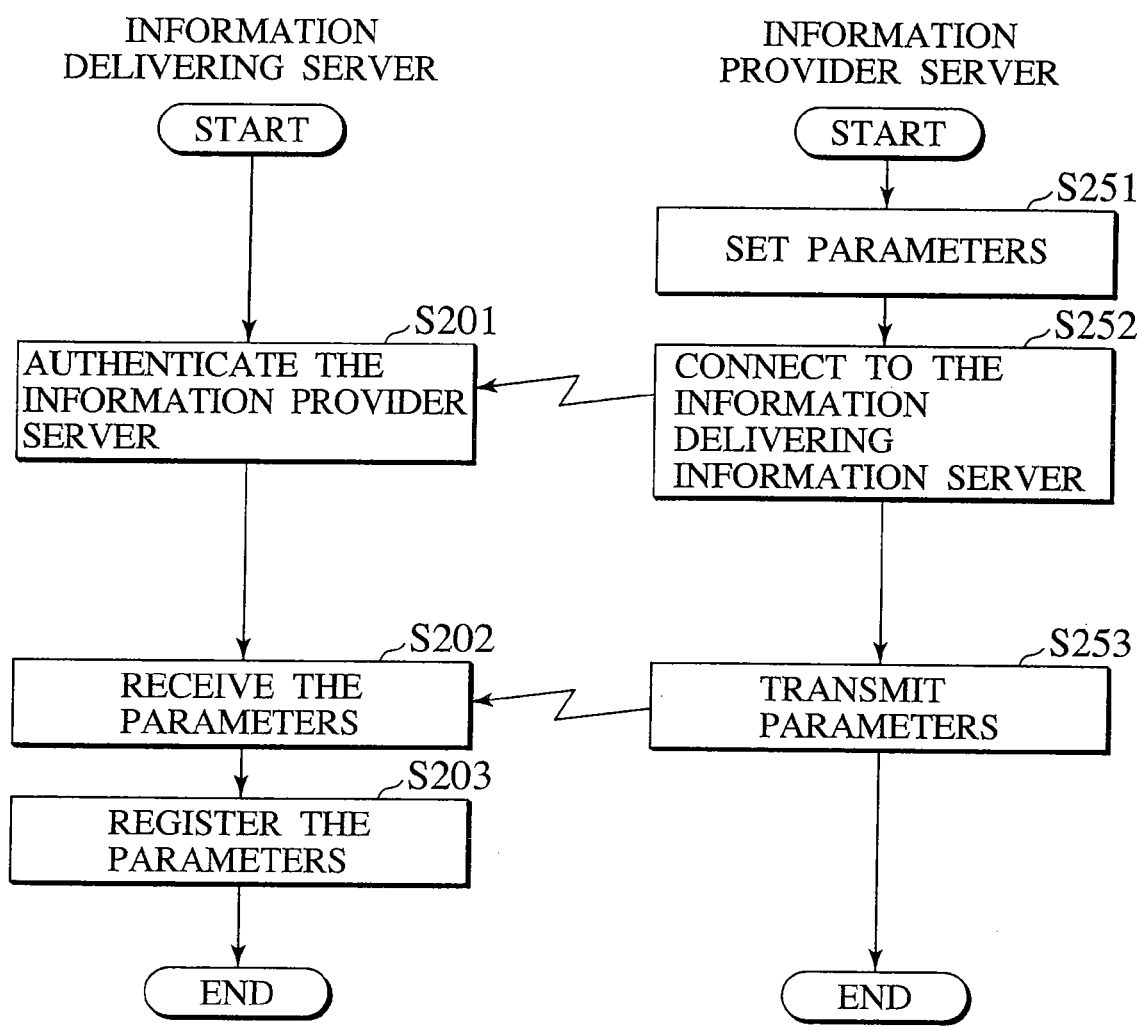
FIG. 8 is a flowchart showing the procedure of transmitting content parameters as given by the information provider server to the information delivering server and registering the content parameters in the information delivering server in accordance with the first embodiment of the present invention.

FIG. 8 is a flowchart showing the procedure of setting up content parameters and registering the content parameters in the information delivering server 1. In this case, an explanation is made relating to the first information provider server 4a. However, this is also the case for the second information provider server.

(a) First, in step S251, the first information provider server 4a sets up content parameters and stores the content parameters in the content parameter storage device 47.

(b) The first information provider server 4a is connected to the information delivering server through the communication control device 44 in the step S252, and then the information delivering server 1 authenticates the first information provider server 4a in the step S201.

(c) Next, in the step S253, the first information provider server 4a obtains the content parameters by means of the content parameter storage device 47 and transmits the content parameters to the information delivering server 1 by means of the content parameter transmission unit 45c. In response to this, the information delivering server 1 receives the content parameters in the step S202 and registers the content parameters in the parameter master storage device 18 by means of the parameter registration unit 15d.

Figure 9:
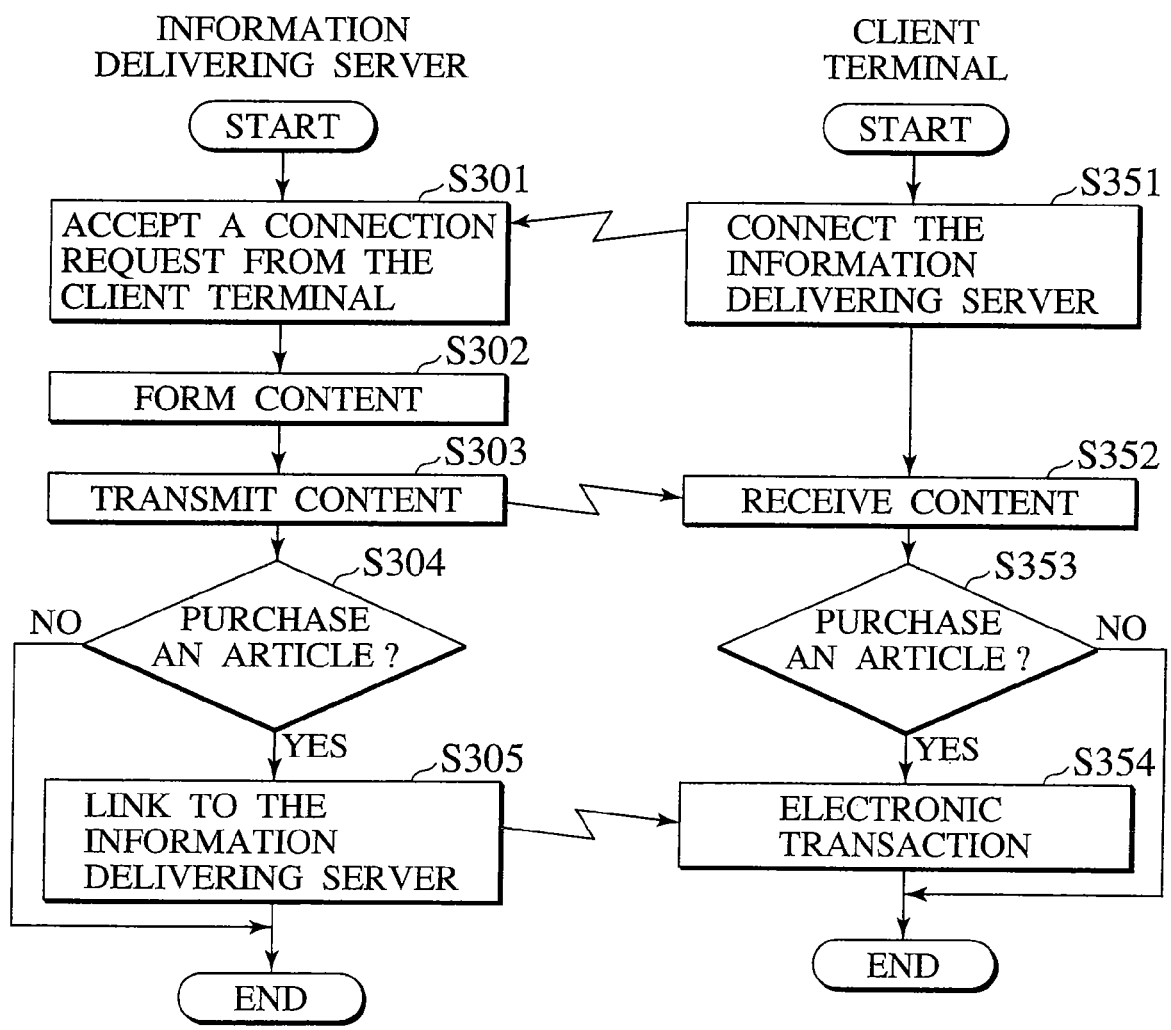
FIG. 9 is a flowchart showing the procedure of providing the client terminal with three-dimensional content by the information delivering server in accordance with the first embodiment of the present invention.

FIG. 9 is a flowchart showing the procedure by which the first client terminal 5a receives information with reference to three-dimensional content for providing information. While an explanation is made relating to the first client terminal 5a, the same procedure is applicable to the second client terminal 5b and the third client terminal 5c.

(a) First, in the S351, the first client terminal 5a makes connection with the information delivering server 1. Then, in the step S301, the information delivering server 1 accepts the request for connection from the first client terminal 5a.

(b) Next, the information delivering server 1 serves to generate content by means of the content providing unit 15d in the step S302 and transmits the content in step S303. Then, in step S352, the first client terminal 5a receives and reproduces the content.

(c) In a case where the first client terminal purchases an article (in steps S304 and S353), the information delivering server 1 provides a link to the corresponding information provider server in step S305 and then provides information by the first client terminal in step S354.

EXAMPLES OF THREE-DIMENSIONAL CONTENT

Figure 10:
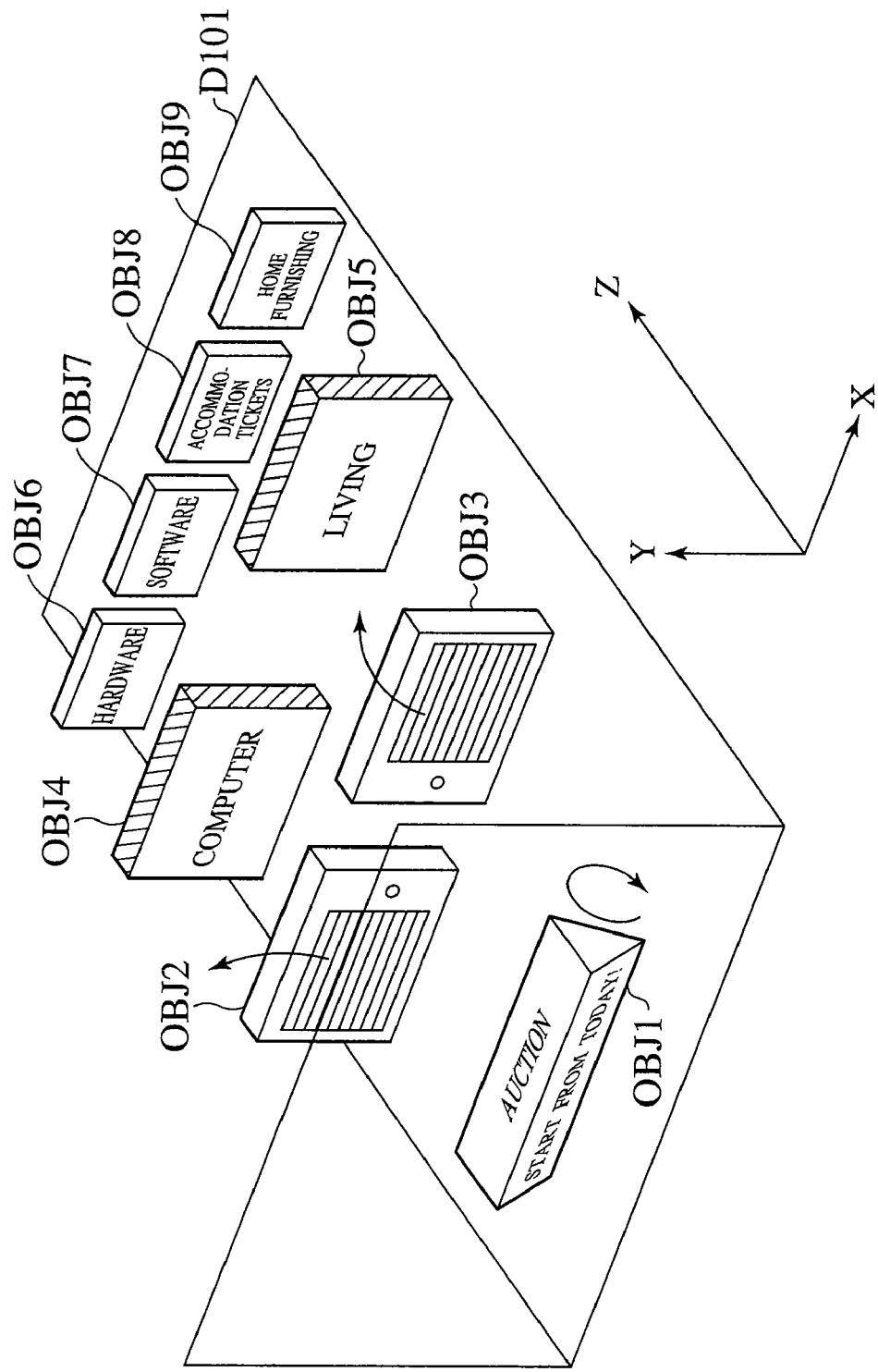
FIG. 10 shows an example of three-dimensional content in accordance with the first embodiment of the present invention.
Figure 11:
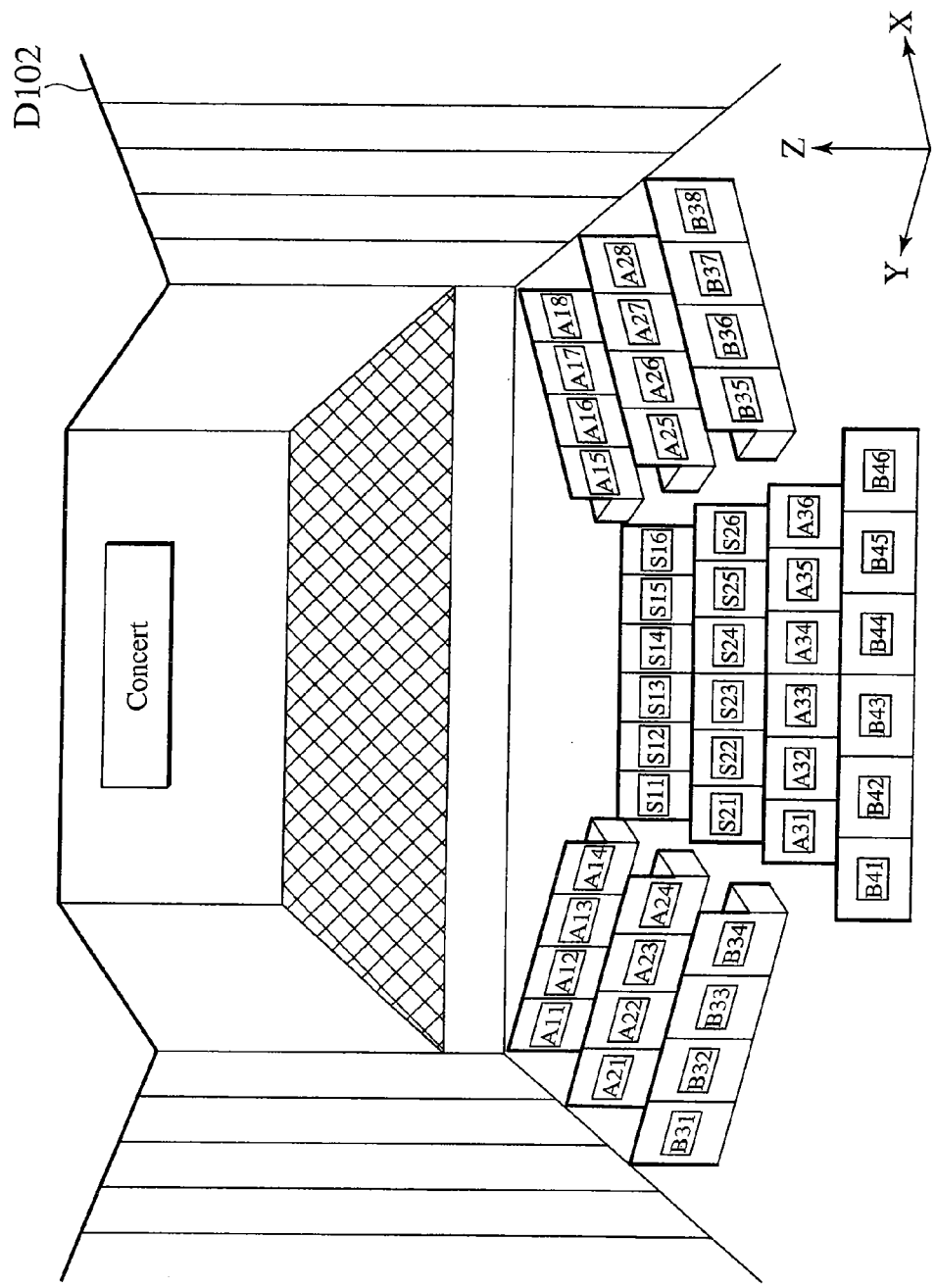
FIG. 11 shows an example of three-dimensional content in accordance with the first embodiment of the present invention (No. 2).

FIG. 10 and FIG. 11 show examples of three-dimensional content.

FIG. 10 is a schematic diagram showing one example of the three-dimensional content D101 provided for a user for the purpose of obtaining desired information in a net auction. This three-dimensional content includes information in three directions, i.e., in the directions of the x-coordinate (the lateral direction), the y-coordinate (the vertical direction), and the z-coordinate (the depth direction) as illustrated in the figure. First, when the user opens this content, an OBJ1 appears in the form of a triangular prism. In this case, messages such as "Auction", "Start from today" and the like are written on the respective sides of the triangular prism which rotates to dynamically display the messages. An OBJ2 and an OBJ3 then appear in the form of a pair of doors. The OBJ2 and the OBJ3 are opened in a left and right direction, like a gate, attracting the interest of the user in the auction. Then, the categories of the auction appear as an OBJ4 and an OBJ5. In this situation, for example, when the OBJ4 is selected, an OBJ6 and an OBJ7 appear while when the OBJ5 is selected, an OBJ8 and an OBJ9 appear. In this case, it is preferable to move the view of the user in the three directions of the x-coordinate, the y-coordinate and the z-coordinate in order that the object as selected by the user is always located in the center position.

FIG. 11 is a schematic diagram showing one example of the three-dimensional content D102 provided for a user for referring to seat information for tickets. By moving the eye view of the user, the user can perceive how the user would view the stage from a particular seat. By this configuration, it is possible in advance to confirm the view angle provided from the position of the seat.

There are other types three-dimensional content as follows.

(a) A shopping guide used from a terminal such as a PDA, a terminal placed in a store or an automobile, a mobile phone and the like. In this case, it is possible to provide sales floor information and just-in-time bargain information by making use of the location information of the terminal.

(b) A navigation guide to a variety of facilities such as amusement parks, gyms, shopping centers, concert halls and the like. Provided in this case are navigation guides to available seats as illustrated in FIG. 11, navigation guides to amusement parks with the rates of congestion and optimal courses, and navigation guides to gyms with the availability of the respective machines.

(c) Broadcast information programs such as the news.

(d) A navigation guide to a local shopping area, providing the location information with spatial correlation in order to give directions.

(e) The provision of information about respective commodities such as service guides, brochures and the like.

(f) Three-dimensional video on demand systems. Namely, a plurality of video images arranged in a three-dimensional space make it easier for a user to compare the images and select an image he desires to watch. Since the video images are arranged in a space, it is possible to provide a plurality of images at a time without need for switching channels.

As described above, the first embodiment of the present invention is related to an information delivering system serving to deliver information through a communication network constructed by interconnecting communication lines. Namely, the information delivering system is composed of an information delivering server connected to a communication network and delivering three-dimensional content provided for presentation of information, and client terminals for receiving and displaying units of information through the communication network. The three-dimensional content as described herein is generated by creating three-dimensional virtual space as projected onto a plane and arranging objects indicative of information within the three-dimensional space. The three-dimensional space as described here is a planar space giving information in a depth direction. In accordance with the present invention, objects are arranged in three-dimensional space and delivered as information including three-dimensional content. It is possible to provide an interface attracting the interest of the customers (users) by means of three-dimensional objects.

Also, the objects are provided in order that the positions thereof are preferably associated with the content of the information. For example, in a case where the objects are arranged in the depth direction, it is preferred that an object located in a deeper position is indicative of information related to a detail of information indicated by an object located in front thereof. Also, it is preferred that objects located in top, bottom, right and left positions with the same depth are indicative of parallel information.

Furthermore, there may be provided a content generation unit for generating three-dimensional content, a content transfer unit for storing the three-dimensional content as generated in the information delivering server.

Still further, there may be provided a property information storage device serving to store the property information of three-dimensional content, a skeleton storage device serving to store the content of invariable components among three-dimensional content, a parameter storage device serving to store parameters which are externally designated, a parameter storage device for storing parameters which are designated by an information provider server, a property information management unit serving to control the management of the property information stored in the property information storage device, a skeleton registration unit serving to store the content of invariable components in the skeleton storage device, a parameter setting unit serving to set up parameters, a parameter registration unit serving to register the parameters in a parameter storage device, and a content providing unit serving to provide the three-dimensional content for the customer by means of the skeleton storage device and the parameter storage device.

The "storage medium" here means a medium in which a program can be stored, such as an external memory device of a computer, a semiconductor memory, a magnetic disk drive, an optical disk, a magneto-optical disk, a magnetic tape and the like. More specifically, the "storage medium" may be a hard disk drive, a floppy disk, a CD-ROM, a MO disk, a cassette tape, an open reel and the like. Also, the "property information" is information about three-dimensional content such as a unique ID, information about an information provider, a file format, the time of creation, the history of modifications and the like.

Namely, the three-dimensional content in accordance with the present invention is separately composed of content skeletons which are generated by engineers having a high level of technology and content parameters which are generated by nonprofessional persons for modifying three-dimensional content. It is possible therefore to easily modify the data in the three-dimensional content.

Also, the parameter setting unit may provide a mechanism for receiving parameters from the information provider server and storing parameters in the parameter storage device. Namely, the parameters as set up by means of the information provider server may be received by the information delivering server and then stored in the parameter storage device, rather than storing parameters in the parameter storage device of the information delivering server. By this configuration, since parameters can be set from a remote site, a person having asked for generation of content can provide, in real time, information about the rate of congestion in a store, time sales of the store and the like.

SECOND EMBODIMENT

Next, a second embodiment of the present invention will be explained with reference to the drawings. In the case of the second embodiment, the generation and reproduction of content as described in conjunction with the first embodiment will be explained in detail.

The content in accordance with the second embodiment is composed of a plurality of frames. The content can be presented as motion pictures by continuously reproducing these frames. Also, the content in accordance with the second embodiment comprises multimedia works which are created by obtaining three-dimensional data and a variety of other data items such as bit-map data, text data, sound data and the like, and combining these data items in the form of interactive content (allowing a two-way electronic communication with a computer). The content in accordance with the second embodiment can be used on a realtime basis.

The schematic system diagram corresponding to the second embodiment of the present invention is similar to that illustrated in FIG. 3 showing the information delivering system in accordance with the first embodiment.

Figure 12:
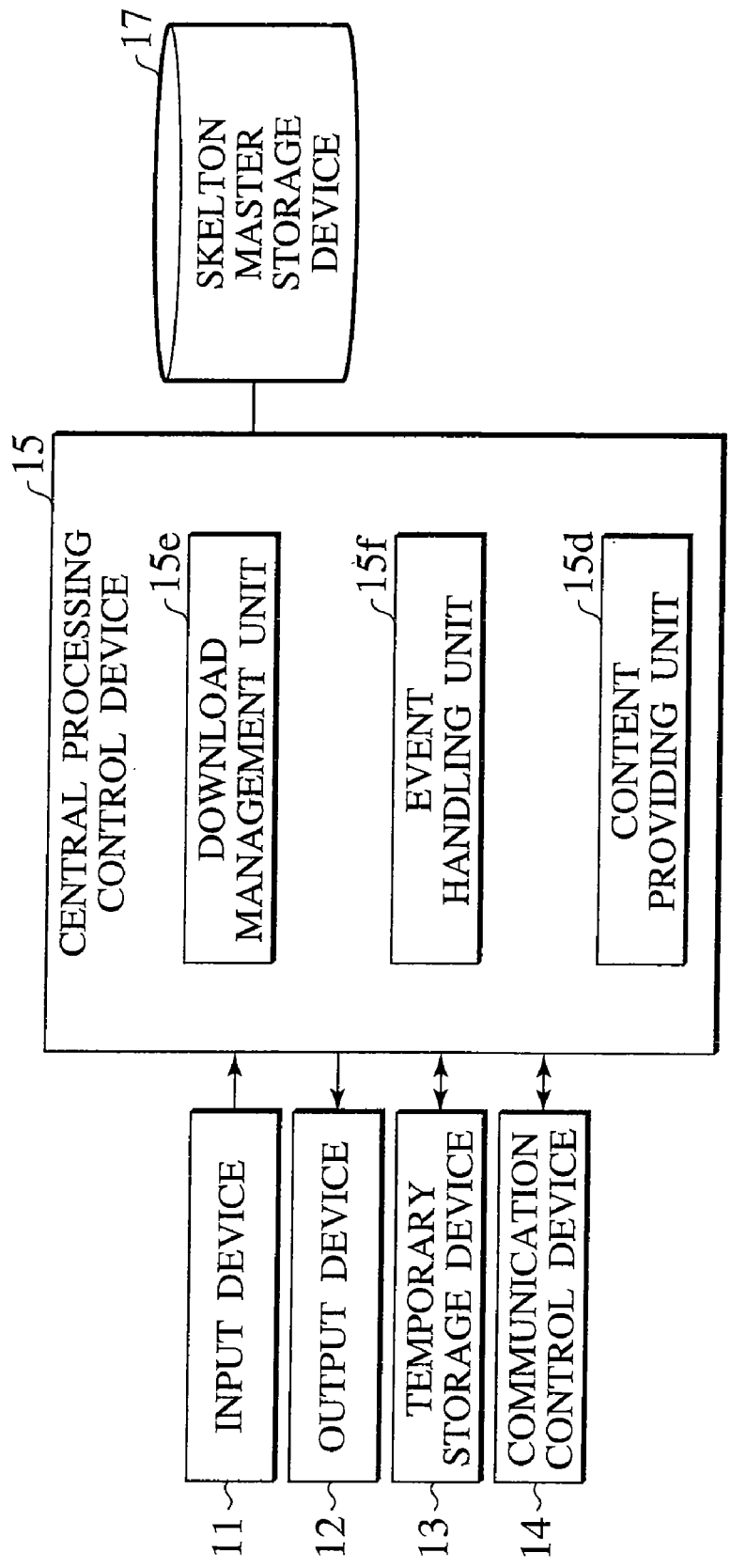
FIG. 12 is a functional block diagram showing the information delivering server in accordance with a second embodiment of the present invention.

FIG. 12 is a functional block diagram showing the information delivering server 1 in accordance with the second embodiment of the present invention. The information delivering server 1 is composed of an input device 11, an output device 12, a temporary storage device 13, a communication control device 14, a central processing control device 15 and a skeleton master storage device 17. The input device 11, the output device 12, the temporary storage device 13, the communication control device 14 and the skeleton master storage device 17 are similar to those in the information delivering server 1 in accordance with the first embodiment.

The central processing control device 15 is provided with a download management unit 15e, an event handling unit 15f and a content providing unit 15d.

When there is a request from one of the client terminals 5a, 5b, 5c for downloading content, the download management unit 15e serves to control the download of the content, and in a case where the three-dimensional content is composed of a plurality of project files, the information delivering server responds to a request for reproducing a scene from the client terminal by transmitting the project file corresponding to the scene as requested. Namely, the download of content may be performed for the project corresponding to the content as a unit or separately for each unit of the content.

The event handling unit 15f serves to handle events such as a mouse click, scrolling and the like from the client terminals 5a, 5b, 5c. While the client terminals 5a, 5b, 5c handle events occurring in the respective client terminal, in the case where an event occurs as a request to the information delivering server 1, the event handling unit 15f may serve to handle such an event. For example, when an event relating to the download of content occurs, the event handling unit 15f handles such an event. The content providing unit 15d serves to provide the client terminals 5a, 5b, 5c with content in response to the request for three-dimensional content.

Figure 13:
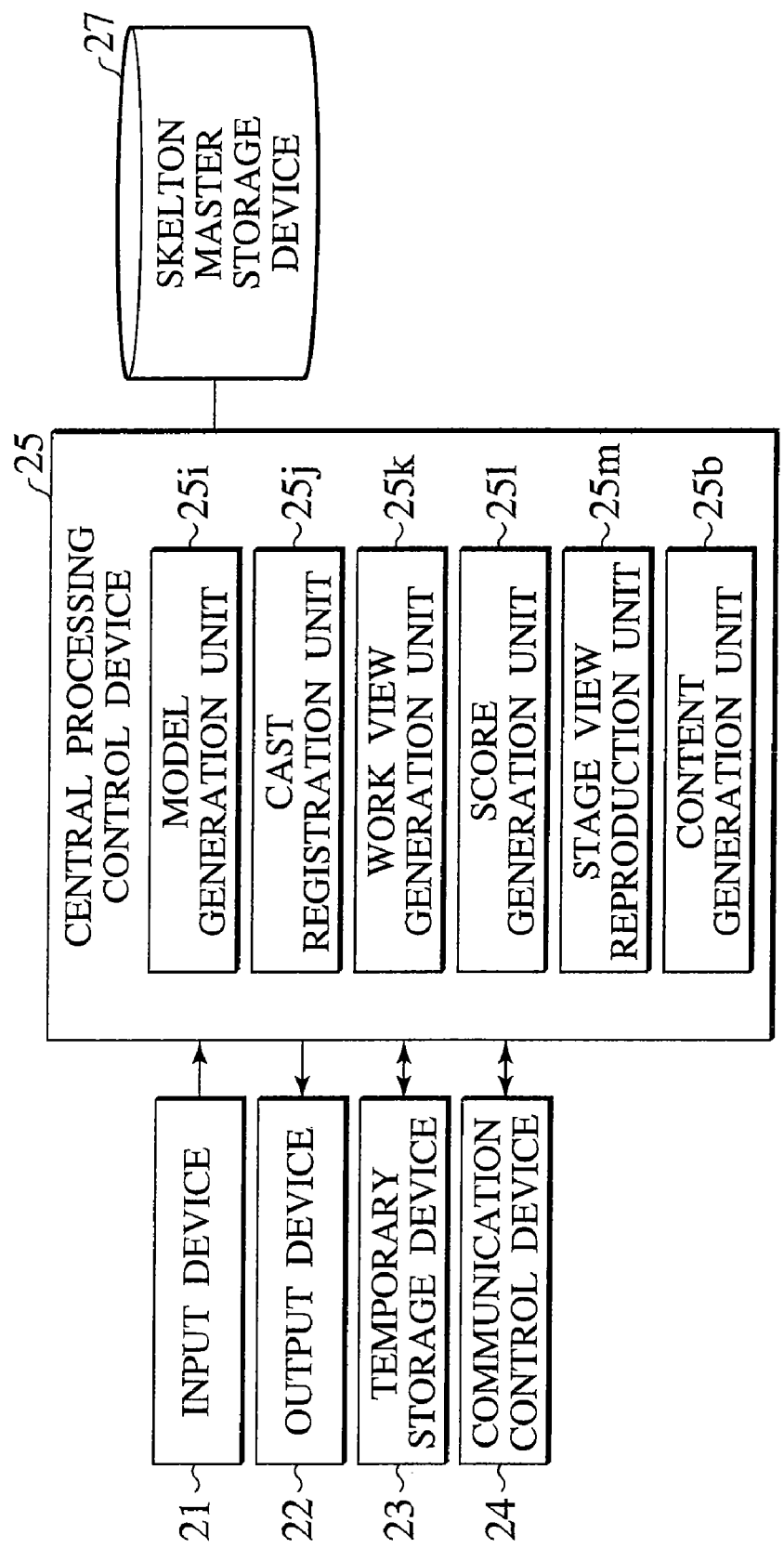
FIG. 13 is a functional block diagram showing the content generation terminal in accordance with the second embodiment of the present invention.

FIG. 13 is a functional block diagram showing the content generation terminal 2 in accordance with the second embodiment of the present invention. The content generation terminal 2 is provided with a function suitable for delivering content through the communication line 6. The content generation terminal 2 is composed of an input device 21, an output device 22, a temporary storage device 23, a communication control device 24, a central processing control device 25 and a skeleton information storage device 27. The input device 21, the output device 22, the temporary storage device 23, the communication control device 24 and the skeleton master storage device 27 are similar as those of the content generation terminal 2 in accordance with the first embodiment.

The central processing control device 25 is provided with a model generation unit 25i, a cast registration unit 25j, a work view generation unit 25k, a score generation unit 25l, a stage view reproduction unit 25m and a content generation unit 25b.

The model generation unit 25i serves to generate models which are used as objects in the three-dimensional content.

Figure 15:
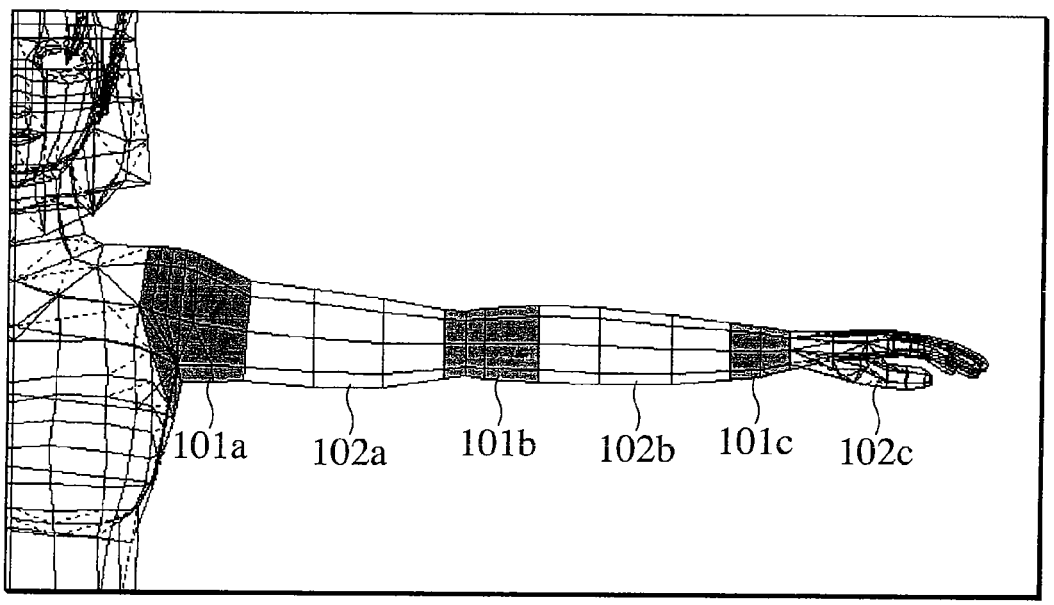
FIG. 15 is a schematic diagram showing examples of the skin components and the bone components of a model in accordance with the second embodiment of the present invention.

The model generation unit 25i serves to also generate data about basic motions such as bending an arm, walking and so forth. At this time, it is preferred to generate data separately as the components (skin components) which are deformed by motion and the components (bone components) which are not deformed by motion. In this case, as illustrated in FIG. 15, the shoulder joint, the elbow, the wrist and the like are defined as skin components 101a, 101b and 101c while other components are defined as bone components 102a and 102b. When the model moves or bends an arm, the skin components 101a, 101b and 101c are altered in shape while the bone components 102a and 102b only move relatively. The data corresponding to the skin components 101a 101b and 101c in motion is not provided by the content generation terminal 2 in accordance with the present invention, but is calculated by the client terminal 5a when reproducing. By this configuration, the file size of the content becomes small and suitable for delivering the content through the communication network 6, thus improving the interactive property of the content.

The cast registration unit 25j serves to register resources such as the models in the content, the camera, the lighting and the like. More specifically speaking, the cast registration unit 25j serves to determine how to display the respective models as generated by the model generation unit 25i, and to register the models as the casts.

The work view generation unit 25k serves to arrange the casts as registered by the cast registration unit 25i in the three-dimensional space.

The score generation unit 25l serves to arrange the casts in time sequences. More specifically speaking, the score generation unit 25l determine how to move the casts as registered by the cast registration unit 25j in accordance with the reproduction time of the three-dimensional content. The score generation unit 25l serves to generate the animation data for each of the models. By this configuration, it is possible to realize the independent motions of the respective models. Also, the models may be grouped while a score is generated for each group. A score is composed of a plurality of frames corresponding to one scene.

The stage view reproduction unit 25m serves to display final images of the content which are generated by the work view generation unit 25k and the score generation unit 25l. The casts as reproduced by the stage view reproduction unit 25m are provided with three-dimensional information and timing information.

The content generation unit 25b serves to generate the final three-dimensional content by the use of the information as provided by the model generation unit 25i, the cast registration unit 25j, the work view generation unit 25k, the score generation unit 25l and the stage view reproduction unit 25m in combination. Also, the content generation unit 25b may serve to generate linkages to external content such as music data, movie data and the like.

Figure 14:
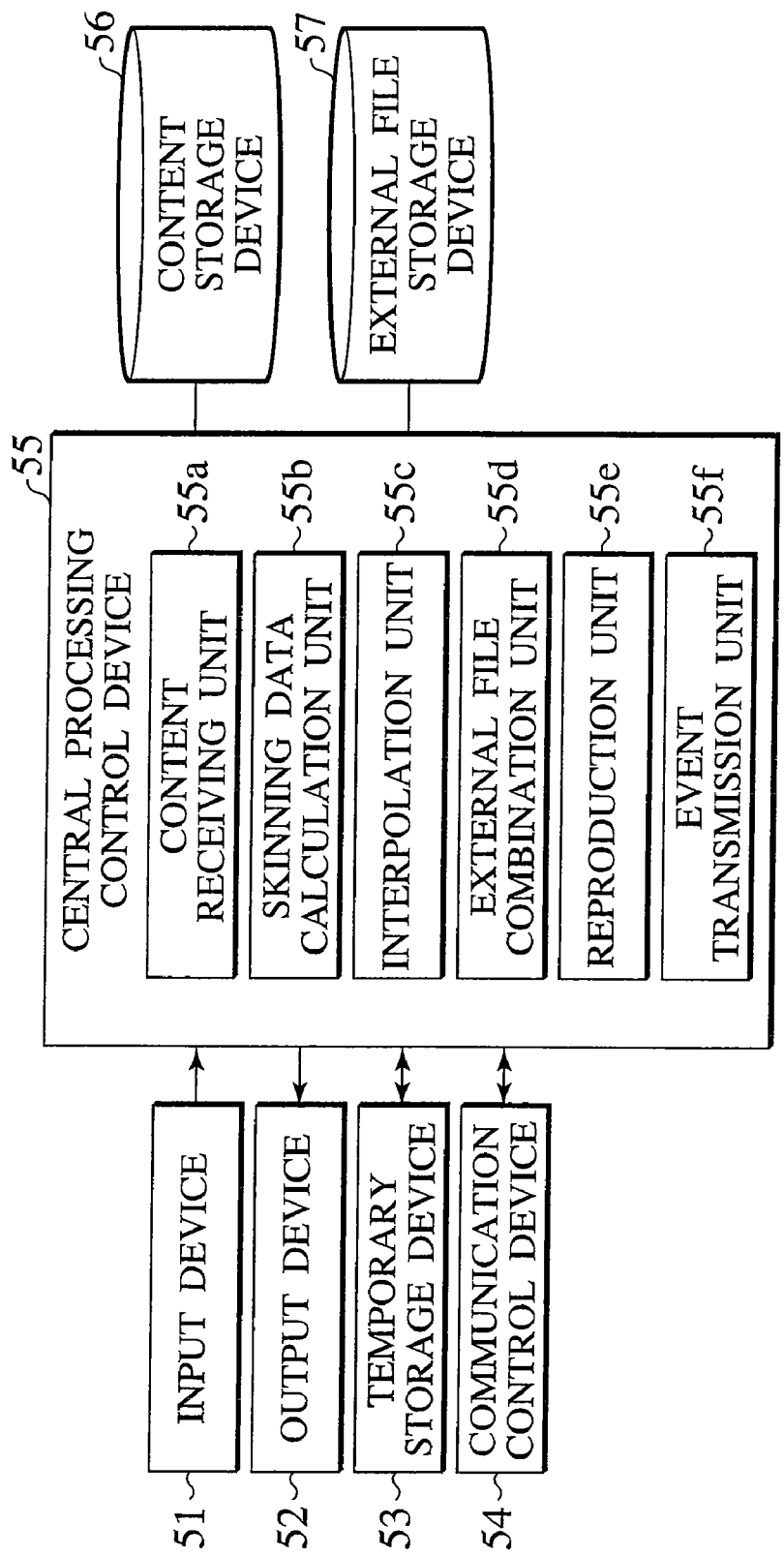
FIG. 14 is a functional block diagram showing the first client terminal in accordance with the second embodiment of the present invention.

FIG. 14 is a functional block diagram showing the first client terminal 5a in accordance with the second embodiment of the present invention. The first client terminal 5a is composed of an input device 51, an output device 52, a temporary storage device 53, a communication control device 54, a central processing control device 55, a content storage device 56 and an external file storage device 57.

The input device 51 is composed of a keyboard, a mouse and the like while the output device 52 is composed, for example, of a display system such as a liquid crystal panel, a CRT monitor and the like or a printing device such as an inkjet printer, a laser printer and the like. The temporary storage device 53 is implemented by ROM and RAM. The ROM serves as a program memory for storing a program which is run in the central processing control device 55 while the RAM serves as a data memory for storing data, which is used as a working area during execution of the program in the central processing control device 55. The communication control device 54 serves as an interface for connection with the communication network 6.

The content storage device 56 serves to store content received from the information delivery server 1. The external file storage device 57 serves to store external files which are linked when reproducing the content stored in the content storage device 56 such as image data, text data, music data, video data and the like.

The central processing control device 55 is provided with a content receiving unit 55a, a skinning data calculation unit 55b, an interpolation unit 55c, an external file combination unit 55d, a reproduction unit 55e and an event transmission unit 55f.

The content receiving unit 55a serves to receive three-dimensional content from the information delivering server 1 and store them in the content storage device 56. More specifically, the three-dimensional content is downloaded from the information delivering server 1 in accordance with a file transfer protocol such as FTP.

The skinning data calculation unit 55b serves to calculate the data of the skin components 101a, 101b and 101c from the data of the bone components 102a and 102b provided by the content generation terminal 2 as illustrated in FIG. 15. When the information delivering server 1 transmits three-dimensional content separately as skin components which are deformed by motion and the bone components which are not deformed by motion, the skinning data calculation unit 55b makes it possible to perform rendering by calculating the weight factors with the coordinates as given to the bone components corresponding to the respective coordinates as given to the skin components in order to determine the profiles of the skin components when reproducing the three-dimensional content.

For example, the data required for moving the skin component 101b can be calculated by calculating the weight factors relating to the respective coordinates as defined in the skin components 101b by the use of the respective coordinates as defined in the bone components 102a and 102b. The profile of a skin component can be determined by repeating this calculation for the respective vertices of the skin component, enabling the rendering operation. Since the coordinates of the bone components for use in calculating a skin component vary during animation, the calculation of the skin component is performed for each frame.

When a start position and an end position are given together with the time period for moving from the start position to the end position, the interpolation unit 55c serves to perform interpolation of frames located with a predetermined time interval from each other between the start position and the end position. Namely, when the information delivering server 1 transmits three-dimensional content including a start position and an end position of a moving object and the time for moving from the start position to the end position, the interpolation unit 55c performs interpolation of images of the moving object by defining a plurality of frames with a predetermined time interval between the start position and the end position and dividing the distance between the start position and the end position by the number of said frames during reproduction of the three-dimensional content. Not only when an object moves through the coordinates but also when animation is generated within an object, the respective coordinates are calculated taking into consideration the variation of the coordinates within the object due to the animation in addition to the variation of the coordinates of the object.

The external file combination unit 55d serves to combine an external file as stored in the external file storage device 57 with three-dimensional content received from the information delivering server 1, when there is a linkage to the external file. By this configuration, it is possible to reduce the file size of the three-dimensional content. Furthermore, the first client terminal 5a can easily designate an external file. When the files required for reproducing three-dimensional content include a file which is not stored in the external file storage device 57, it is preferable to send a request to the information delivering server 1 for downloading the file during reproduction of the three-dimensional content.

The reproduction unit 55e serves to receive the three-dimensional content through the content receiving unit 55a and reproduce the three-dimensional content by using the result of a calculation of the skinning data as obtained by means of the skinning data calculation unit 55b, the result of the interpolation as obtained by means of the interpolation unit 55c, the combination of external files as obtained by means of the external file combination unit 55d and so forth. By this configuration, the three-dimensional content can be displayed at the first client terminal 5a. When a manipulation such as clicking a mouse button, scrolling and the like is performed at the first client terminal 5a, the event transmission unit 55f serves to transmit the corresponding event to be handled by the information delivering server 1 to the information delivering server 1.

FIG. 16 through FIG. 25 are schematic diagrams showing windows opened when creating content with the content generation terminal 2. FIG. 16 through FIG. 25 are provided for illustrating the process of making content which enables a humanoid model to move by walking through three rooms with different appearances. The animation is such that the model is first standing in a room A, and when the user designates a room B or C, the model moves to the room as designated.

A project file is generated for each of the three rooms given different names, i.e., A, B and C for the content as generated by the content generation terminal 2 in accordance with the second embodiment. Each project file includes necessary information such as information about motion pictures relating to the motions of the model, the view angle of the camera and the like and other types of information such as music files in order that a sequence of motions are fully defined in one project file in a self-contained manner. Furthermore, a unit of content is provided by linking a self-contained project file while which project file is to be reproduced is determined by user-manipulation.

Figure 16:
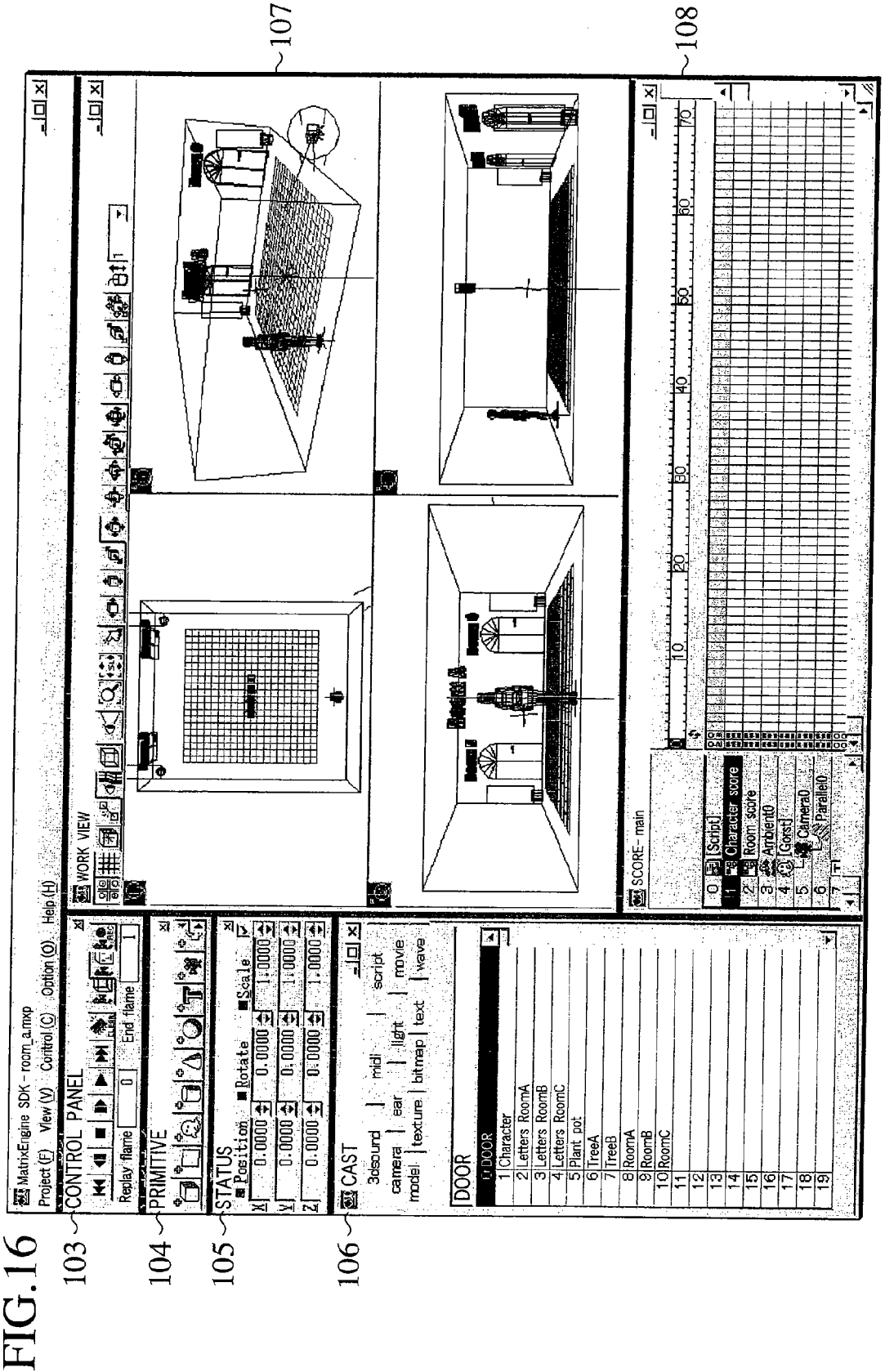
FIG. 16 shows an example of the screen of the content generation terminal in accordance with the second embodiment of the present invention (No. 1).

FIG. 16 is a schematic diagram showing a main view opened when creating content. The main view is composed of a control panel window 103, a primitive window 104, a status window 105, a cast window 106, a work view window 107 and a score window 108 respectively. The control panel window 103 serves to take control of a reproducing head in order to designate the frame under editing and make it possible to quickly jump from the current frame to another frame.

The primitive window 104 is a window for making use of casts as prepared in the content generation terminal 2 in advance. It is possible to easily create casts by means of the primitive window 104.

The status window 105 is a window for numerically displaying the status of the respective objects in a three-dimensional world in terms of the coordinates, the rotation, the scale thereof. Also, it is possible to perform displacement, rotation, expansion and reduction by directly inputting new values to rewrite the values displayed.

The cast window 106 is used to control the management of all the data items which are used in content and is mainly used to provide, edit and manage casts. In this case, the property window of a cast is opened by double clicking the name of the cast as registered.

The score window 108 is a window for registering the casts of animation, and for setting a variety of items relating to the animation and setting the motion conditions of the respective casts during reproduction of the other items of three-dimensional content for each frame.

The work view window 107 is a window for confirming and setting the locations and the directions of models and cameras as registered in a score. In the work view window 107, the three-dimensional space is displayed from a variety of view points.

For example, explanation will be made relating to the case where a project is developed for the room A.

Figure 17:
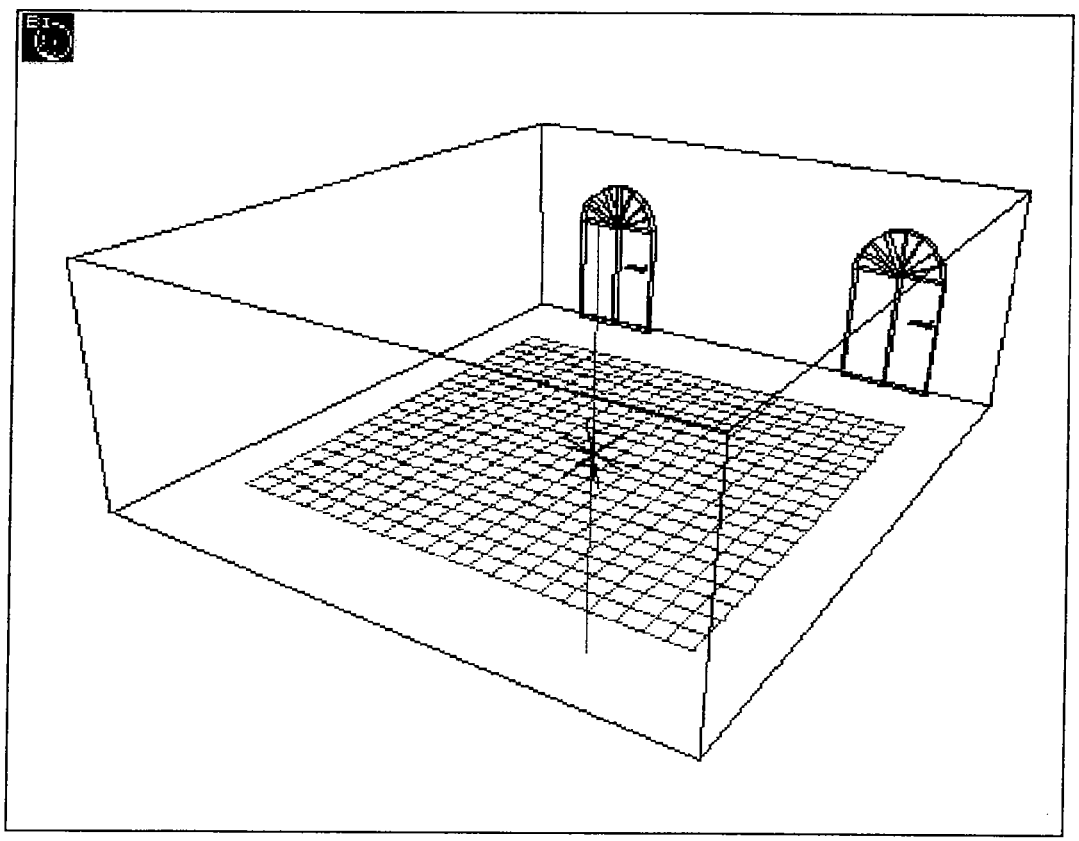
FIG. 17 shows an example of the screen of the content generation terminal in accordance with the second embodiment of the present invention (No. 2).

First, as illustrated in FIG. 17, the room A is provided with two exits.

Figure 18:
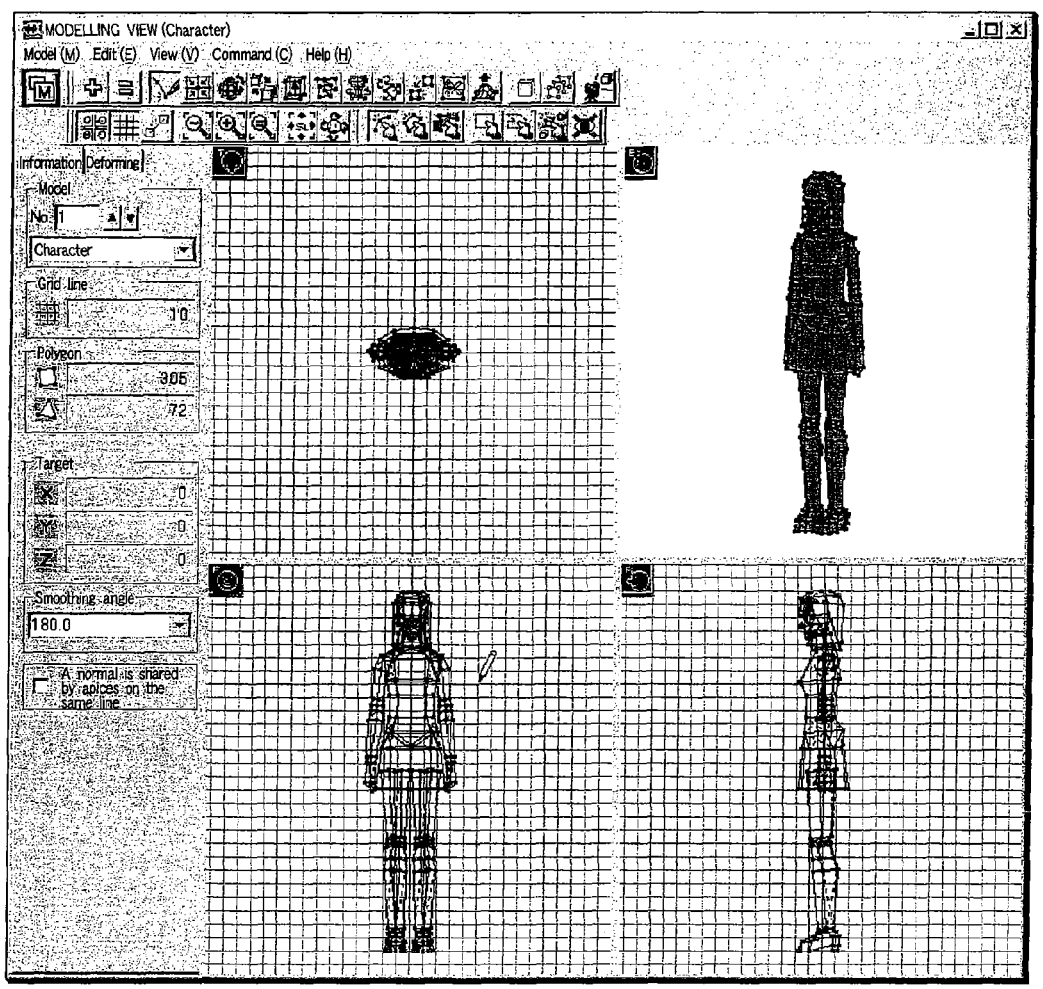
FIG. 18 shows an example of the screen of the content generation terminal in accordance with the second embodiment of the present invention (No. 3).

Next, as illustrated in FIG. 18, a model cast is generated and edited in a modelling view window. In this case, it is also possible to divide the respective parts of the profile in "groups" and register them as the model cast. It is preferable to execute the setting of the groups such as the groups (the bone components) which are desired to be displaced, rotated and/or subjected to scale animation, the groups (the skin components) which are provided with vertices animated, like rubber objects, in synchronism with the animation of a plurality of parent groups linked thereto.

Figure 19:
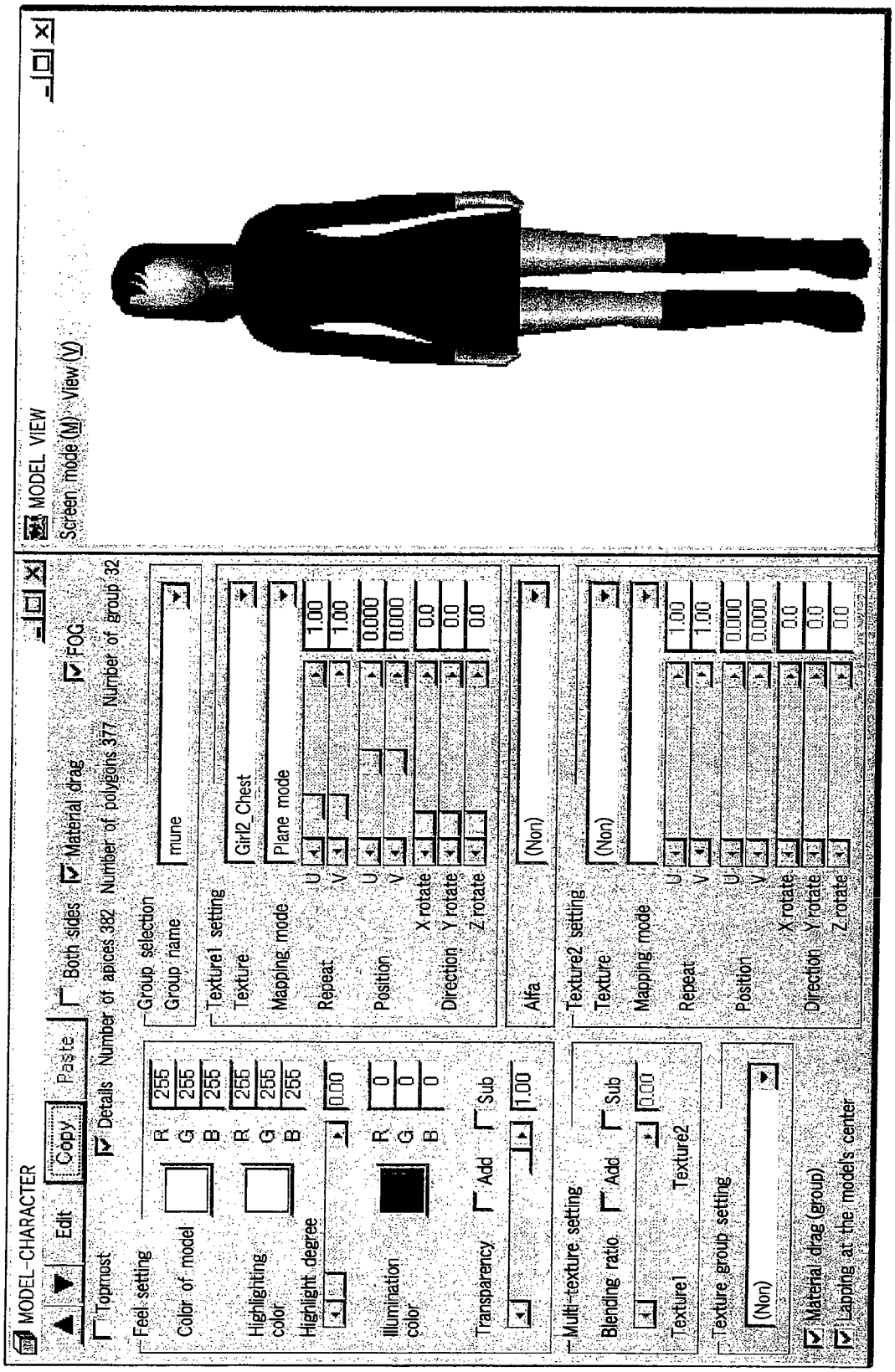
FIG. 19 shows an example of the screen of the content generation terminal in accordance with the second embodiment of the present invention (No. 4).

Furthermore, as illustrated in FIG. 19, the property window of a model cast is opened followed by setting the feel of a material and the textures to be mapped for each group of the model cast.

Figure 20:
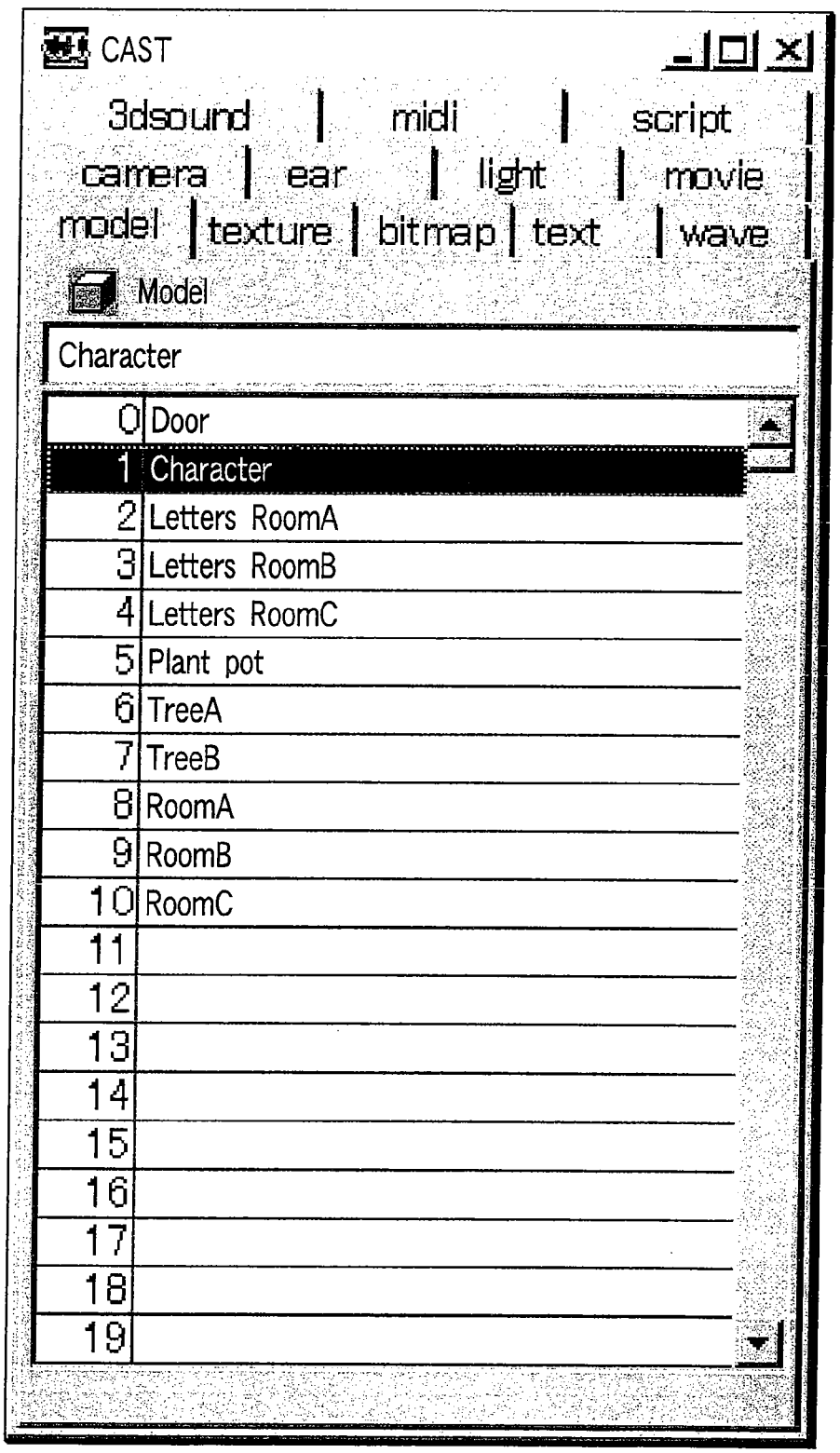
FIG. 20 shows an example of the screen of the content generation terminal in accordance with the second embodiment of the present invention (No. 5).

FIG. 20 shows a screen of a content generation terminal in which the model generated in FIG. 18 and FIG. 19 is registered as a cast. Such registration of models is conducted in the cast window 106.

Figure 21:
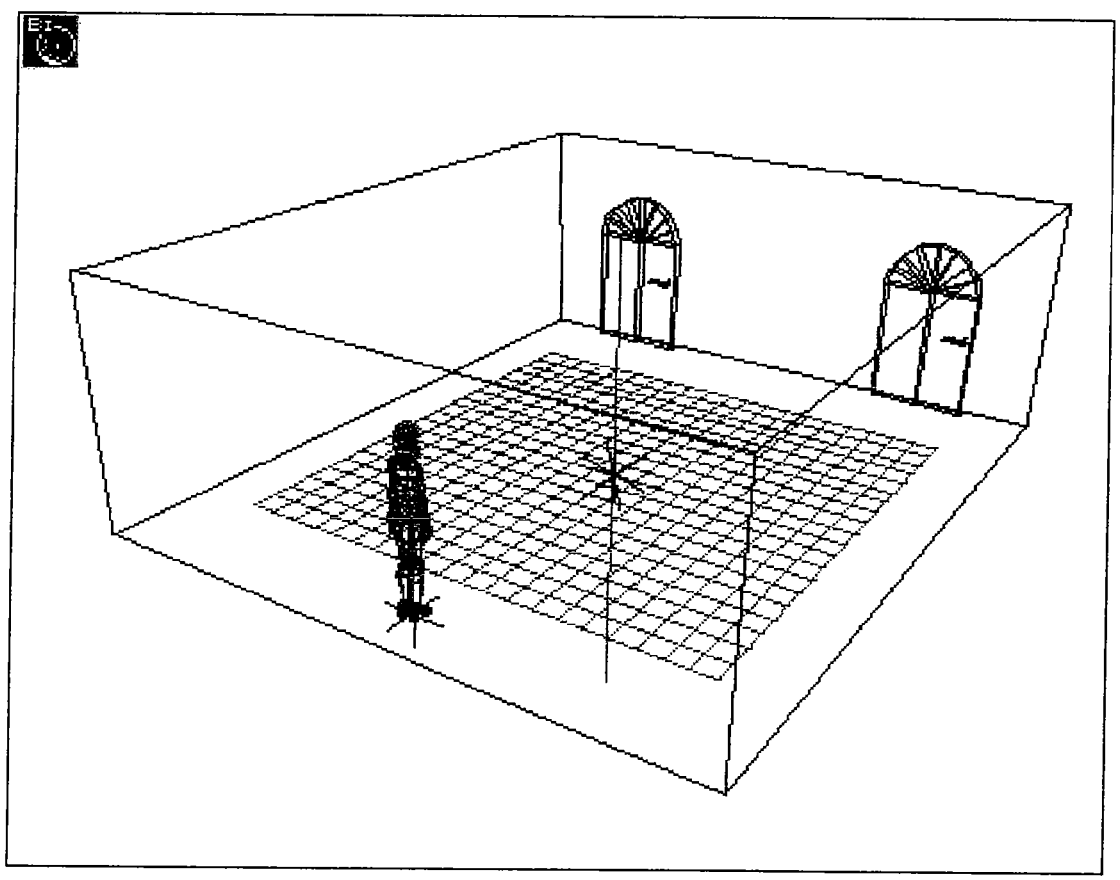
FIG. 21 shows an example of the screen of the content generation terminal in accordance with the second embodiment of the present invention (No. 6).

Furthermore, as illustrated in FIG. 21, the model as generated in FIG. 18 and FIG. 19 is arranged in the center of the room A.

As explained in the above, the model in the room A is generated.

Figure 22:
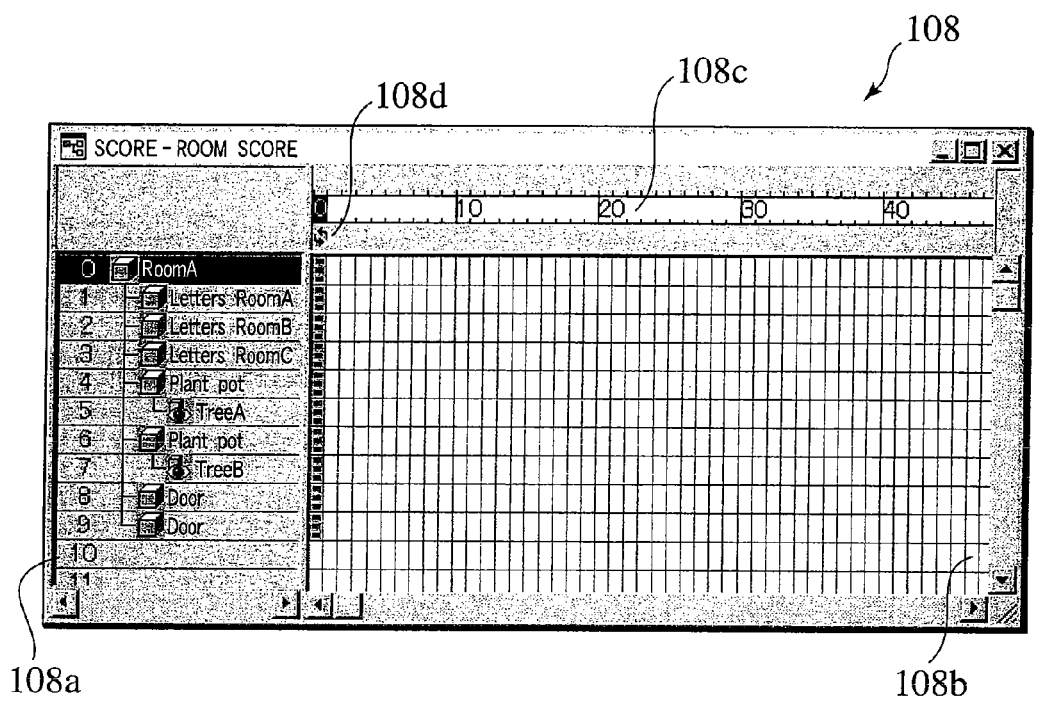
FIG. 22 shows an example of the screen of the content generation terminal in accordance with the second embodiment of the present invention (No. 7).
Figure 23:
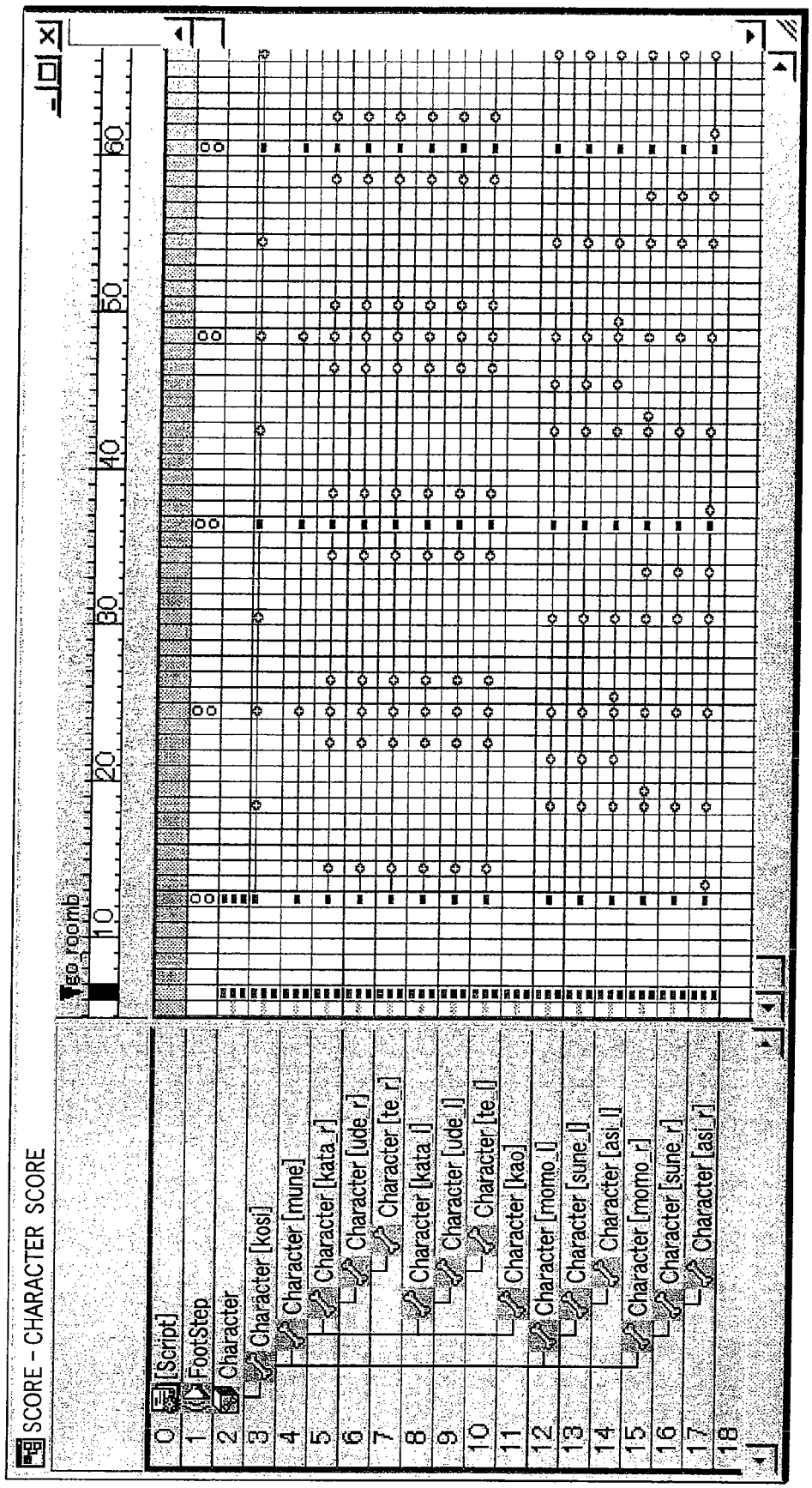
FIG. 23 shows an example of the screen of the content generation terminal in accordance with the second embodiment of the present invention (No. 8).
Figure 24:
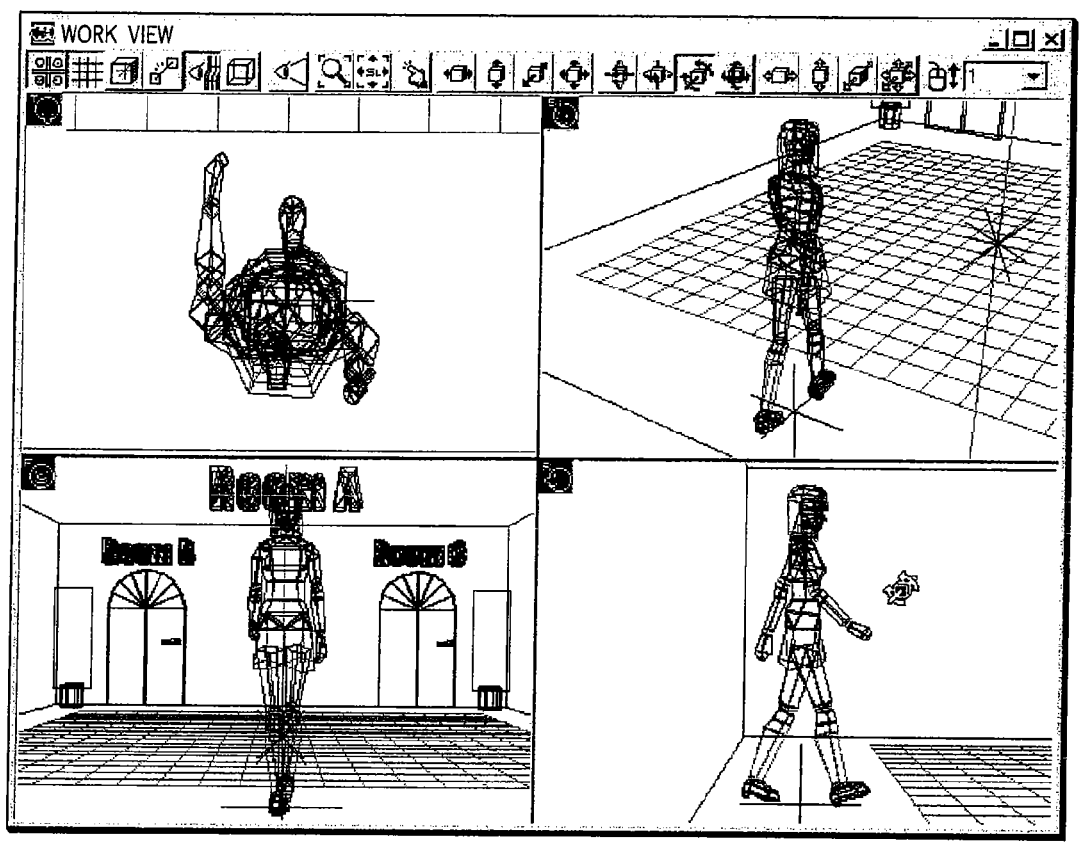
FIG. 24 shows an example of the screen of the content generation terminal in accordance with the second embodiment of the present invention (No. 9).

Next, FIG. 22 through FIG. 24 are provided for illustrating the process of making the moving animation of the model generated in FIG. 18 and FIG. 19.

FIG. 22 is a view showing the score window 108. Displayed in the score window 108 is a list of models including "Character string ROOM A", "Plant pot" and so forth. Each of these models is provided with an array of frames each of which is obtained by stopping the motion picture with a predetermined time interval. Also, there is provided a reproducing frame indication track 108c. The reproducing frame indication track is used to display the frame numbers and the reproducing head (the black frame) in order to indicate the frame being reproduced in a score. Furthermore, it is possible to insert and delete the frames as selected by means of a reproduction control unit 108d. Also, it is possible to instruct to repeat certain animation.

Figure 25:
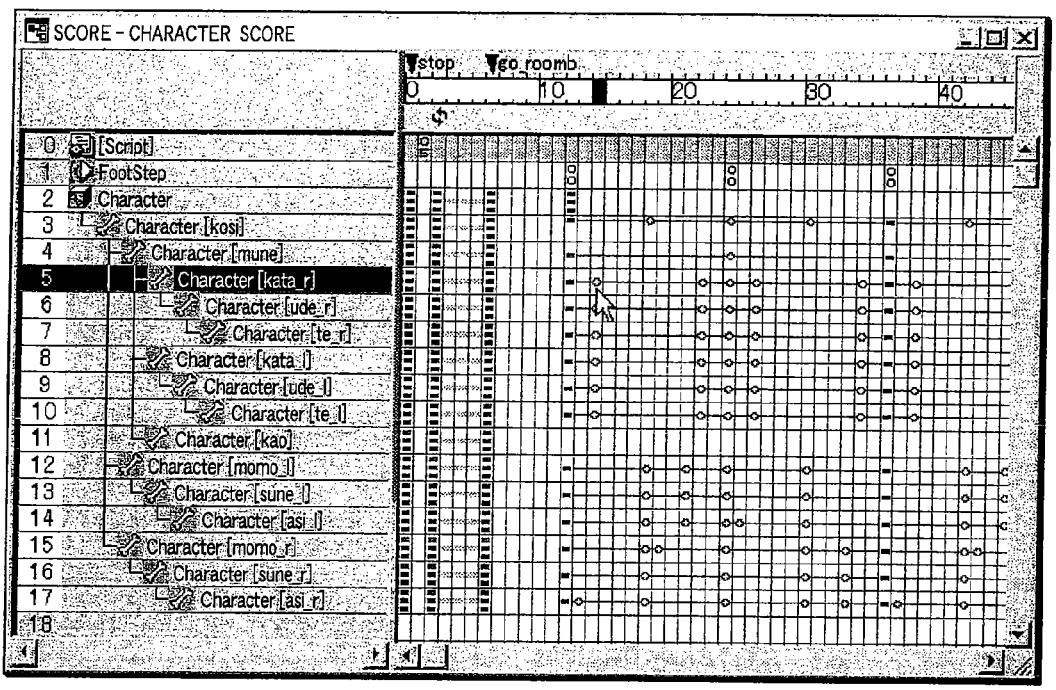
FIG. 25 shows an example of the screen of the content generation terminal in accordance with the second embodiment of the present invention (No. 10).

FIG. 23 is a view showing a score window 108 in which the motion animation is created while FIG. 24 is a view showing a work view window 107. The model is located in the center of the room A in the work view window 107 followed by setting the key frame in the score window 108. Next, the model is located near the exit B in the work view window 107 and the key frame is set seconds thereafter. Furthermore, as illustrated in FIG. 25, it is possible to change the animation by user's manipulation such as "stop", "go roomb", "go roomc" and the like in the reproduction control unit 108d.

Then, the explanation is made in details relating to the moving animation by the use of the interpolation unit 55c of the first client terminal 5a, particularly in the case of the moving animation of a person.

The moving animation of a person is expressed by a combination of the straight-line motion of the upper half part of the body and the repeated gait motion of the lower half of the body, i.e., "walking". With respect to the operation of the upper half of the body, there are stored only three values, i.e., the start position (the center position of the room), the end position (the exit as selected) and the frame number which is proportional to the time there between. The position after one frame can therefore be calculated by the values.

Namely, the position in the N-th frame is calculated by an equation of the start position+(the end position−the start position)*N/the total frame number.

With respect to the repeated motion of the lower half of the body, i.e., "walking", it will be a simple expression that both legs swing like a pendulum in opposite directions. A more complicated walking motion may be considered by preparing a set of data items which include the positional and rotational information for each frame in order that the walking motion corresponding to a step is expressed, for example, by ten frames, so that data is provided corresponding to a step. Then, a sequence of motion is repeatedly expressed by consecutively connecting the start of walking with the end of walking by the use of the repetition setting as separately prepared in advance.

Also, the center position of the lower half part of the body is linked to the position of the upper half (by a parent child relationship). Accordingly, the positional movement of the upper half spreads to the lower half as it is. When the position of the upper half reaches the end position, the repeated motion of the lower half of the body is stopped.

Next, the progressive download, which make it easy to download content from a server, will be explained. Normally, when the user selects the room B or the room C after reproducing the room A, the project file of the room selected is downloaded. In this case, however, it may be impossible to meet demand for the interactive property of the content since the necessary files are downloaded only after selecting the files by the user. In order to solve this shortcoming, the content in accordance with the second embodiment of the present invention makes use of progressive download technology. In accordance with a progressive download, when reproducing the project files, the download operation is initiated for a project file(s) which may possibly be selected later. When the project file(s) is actually selected, the download operation of the project file(s) as selected is continued while, if not selected, the download operation of the project file(s) as not selected is discontinued.

Figure 26:
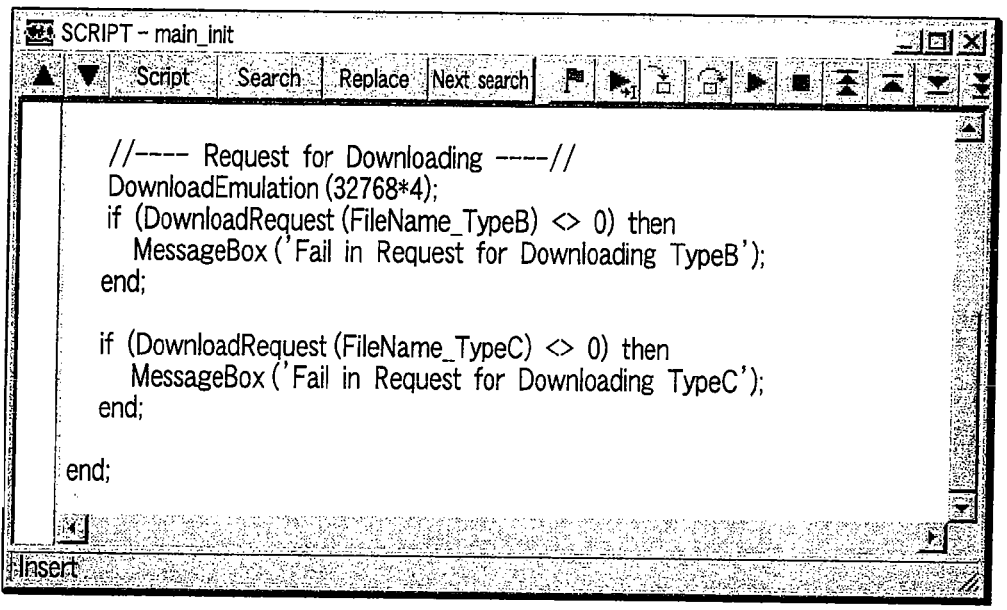
FIG. 26 shows one example of a script for the progressive download in accordance with the second embodiment of the present invention (No. 1).
Figure 27:
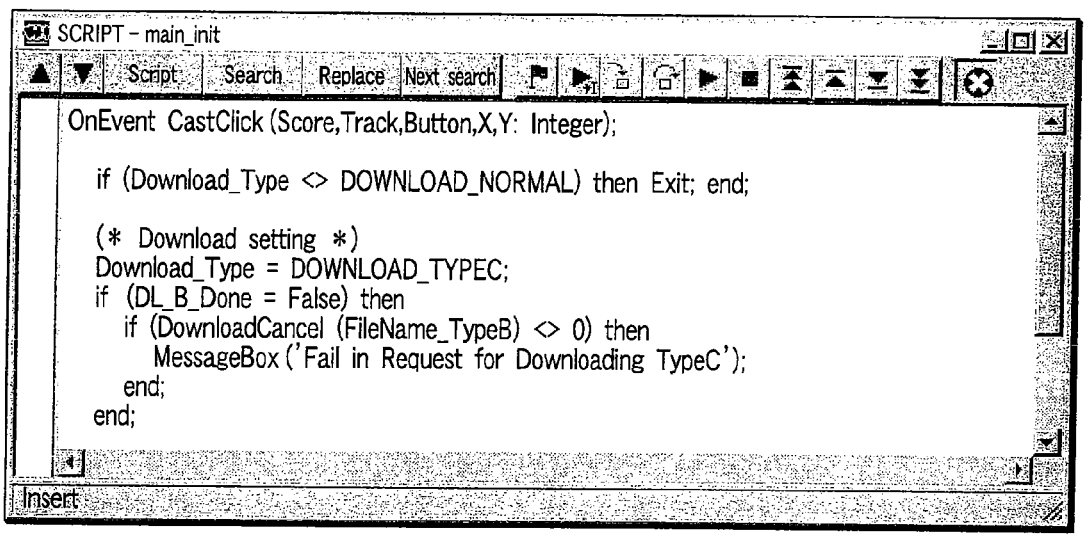
FIG. 27 shows the example of the script for the progressive download in accordance with the second embodiment of the present invention (No. 2).

In order to implement this progressive download, when the event handling unit 15f of the information delivering server 1 receives an event of a request for the progressive download, an appropriate script is executed in response to the request (e.g., the download of project files). FIG. 26 and FIG. 27 show one example of such a script. When the room B or the room C is selected by an event which is caused by the user during the execution of the script, the download of the room which is not selected is cancelled. Also, the download may be cancelled by a request from the client terminal 5a. In this case, the event handling unit 15f stops the download of the project files as designated immediately after receiving the request.

Figure 29:
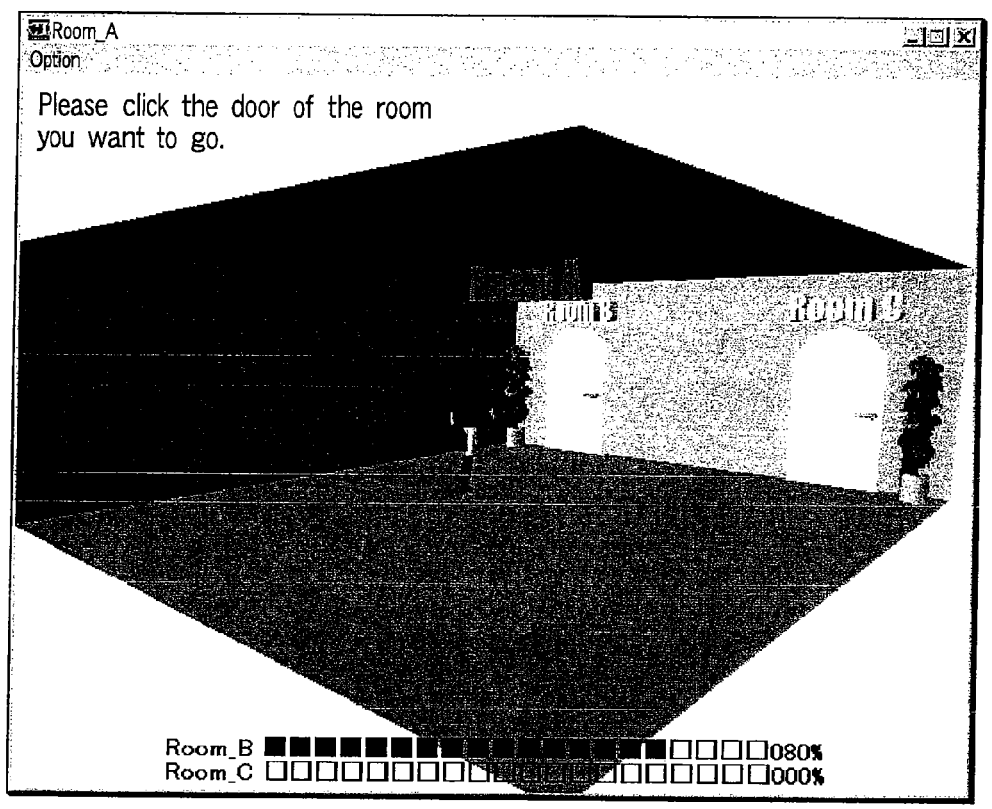
FIG. 29 shows the example of the content of the progressive download in accordance with the second embodiment of the present invention (No. 2).
Figure 30:
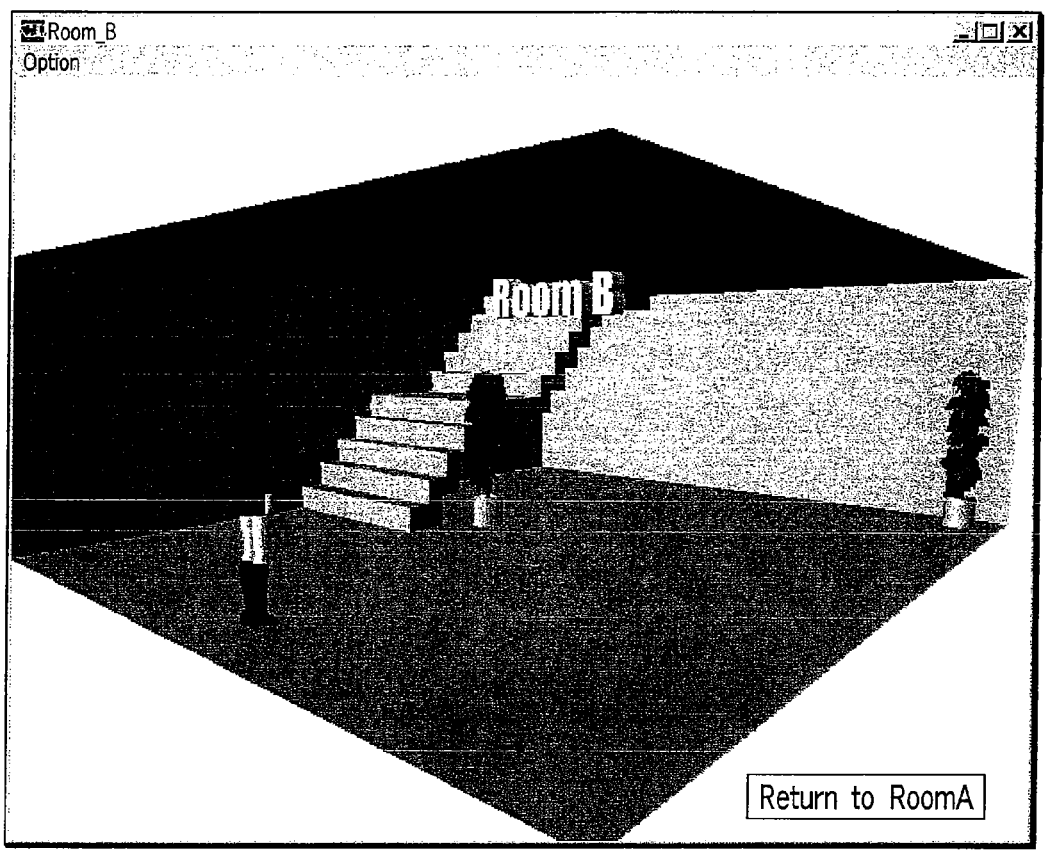
FIG. 30 shows an example of the content of the progressive download in accordance with the second embodiment of the present invention (No. 3).

This process will be specifically explained with reference to FIG. 28 through FIG. 30 in conjunction with the content as described above. The status bars as illustrated in the bottoms of FIG. 28 through FIG. 30 indicate the progress of downloading the respective project files.

Figure 28:
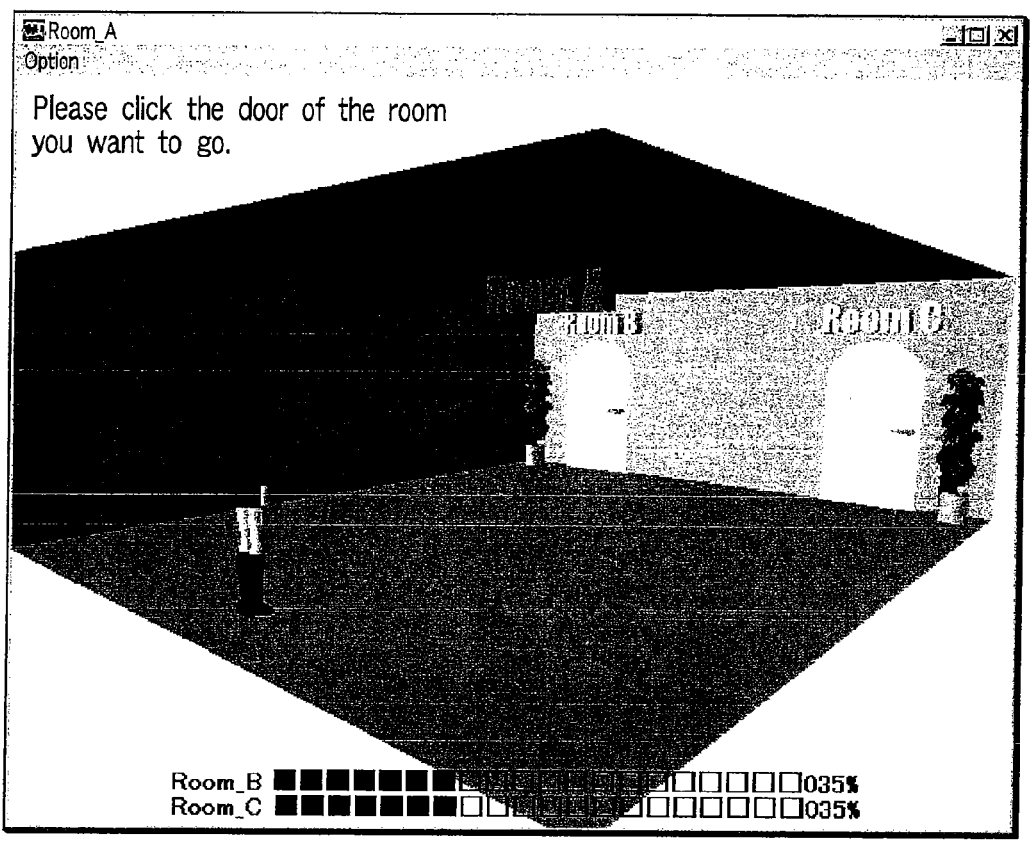
FIG. 28 shows an example of the content of the progressive download in accordance with the second embodiment of the present invention (No. 1).

At first, as illustrated in FIG. 28, the download of the project files of the rooms B and C starts at the same time as the room A is reproduced. Next, when the user selects the room B, the download of the project files of the room C is stopped while the download of the project files of the room B is continued. On the other hand, the model cast begins walking toward the room B in response to the selection of the room B. Then, as illustrated in FIG. 30, the model cast reaches the room B. Since there is provided in the room B only the option of returning to the room A, the download of any project file is unnecessary and therefore the progressive download is not performed.

By this progressive download, the user need not wait for completion of downloading and therefore can readily enjoy the three-dimensional content. Furthermore, it is possible to improve the interactive property at the information provider server 1 and the client terminal 5a by dividing one unit of content into project files which are small units for downloading.

It is therefore possible to realize a method of providing the three-dimensional content with the interactive property described in the first embodiment by the content generation method and the content reproduction method described in the second embodiment.

OTHER EMBODIMENTS

As described above, while the present invention has been described in conjunction with the first and second embodiments, the present invention should not be limited to the description and drawings as part of the disclosure. Various alternative embodiments, practical applications and implementations will be apparent from the disclosure to those skilled in the art.

The information provision in accordance with the present invention is not limited to trade transactions relating to the exchange of money and articles. Namely, the information provision can be applied to a case of referring to and providing information as long as two-way information distribution occurs.

While the information provision mechanism is implemented in the information provider server in the case of the first and second embodiments, the mechanism can be implemented in the information delivering server in place of the information provider server. It is possible to employ any other configuration which is not necessarily similar to the first and second embodiments as long as it enables similar functions. Furthermore, the information delivering server, the content generation terminal, the information provider server, the client terminal and the like are not necessarily implemented in separate hardware devices but can be implemented within a single hardware device provided with a plurality of functions.

It is also possible to combine external files when reproducing in the case of the first embodiment like the second embodiment. Namely, in the case of the first embodiment, parameters can be combined when reproducing. In such a manner, it is possible to design a new system by selecting functions from the functions provided in the first embodiment and the second embodiment.

Needless to say, like this, a variety of embodiments of the present invention are possible even if not described here. Accordingly, the present invention should be limited only by matters defining an invention in the claims which are appropriate from the view point of the description.

PRACTICAL INDUSTRIAL APPLICABILITY

As described above, in accordance with the information delivering system and the information delivering method of the present invention, it is possible to provide an interface attracting the interest of the users by making use of three-dimensional objects.

Furthermore, in accordance with the information delivering system and the information delivering method of the present invention, it is possible to easily modify data of three-dimensional content.

What is claimed is:

1. An information delivering method, comprising:
   generating three-dimensional content by creating a three-dimensional virtual space as projected onto a plane and arranging an object indicative of said information in said three-dimensional space, wherein said three-dimensional content includes a skin component which is deformed with motion and a separate bone component which is not deformed with motion;
   delivering said three-dimensional content to a client terminal through a communication network by delivering an initial skin component and an initial bone component and a subsequent bone component; and
   displaying said information on a display device by said client terminal by rendering said initial skin component and said initial bone component;
   determining a subsequent skin component based on the subsequent bone component, and rendering said subsequent skin component and said subsequent bone component.

2. The information delivering method as in claim 1 wherein a position of said object is associated with said information.

3. The information delivering method as in claim 1 wherein said object is a polyhedron each of whose facets is used to display said information in order that the respective units of said information are shown by turning said polyhedron.

4. The information delivering method as in claim 1 wherein a position of said object provides a hierarchical representative of said information.

5. The information delivering method as in claim 1 further comprising:
   storing said three-dimensional content as generated in an information delivering server.

6. The information delivering method as in claim 1 further comprising:
   storing the property information of said three-dimensional content;
   storing the content of invariable components among said three-dimensional content in a skeleton storage device;
   storing parameters which are externally designated;
   registering said parameters in a parameter storage device; and
   providing said three-dimensional content for customers with reference to said skeleton storage device and said parameter storage device.

7. The information delivering method as in claim 1 further comprising:
   interpolating frames, at said client terminal, with a predetermined time interval between a start position and an end position by the number of said frames during reproducing said three-dimensional content, when said information delivering server transmits three-dimensional content including said start position and said end position of a moving object and a time designated for moving from said start position to said end position.

8. The information delivering method as in claim 1 further comprising:
   combining, at said client terminal, an external file as stored in said client terminal when an information delivering server transmits three-dimensional content including a request for a linkage to said external file.

9. The information delivering method as in claim 1 wherein said three-dimensional content is composed of a plurality of project files and wherein an information delivering server further comprises controlling content download by transmitting the project file corresponding to a scene as requested from said client terminal for reproducing the scene.

* * * * *